(12) United States Patent
Lombrozo

(10) Patent No.: US 9,352,682 B2
(45) Date of Patent: May 31, 2016

(54) APPARATUS FOR ABSORBING A FORCE

(71) Applicant: Google Inc., Mountain View, CA (US)

(72) Inventor: Peter Craig Lombrozo, Scotts Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/716,790

(22) Filed: May 19, 2015

(65) Prior Publication Data

US 2015/0329037 A1 Nov. 19, 2015

Related U.S. Application Data

(63) Continuation-in-part of application No. 14/276,086, filed on May 13, 2014.

(51) Int. Cl.
*F16M 13/00* (2006.01)
*B60Q 1/04* (2006.01)
*F16F 7/12* (2006.01)

(52) U.S. Cl.
CPC ............ *B60Q 1/0483* (2013.01); *B60Q 1/0491* (2013.01); *F16F 7/125* (2013.01)

(58) Field of Classification Search
CPC ..... B60Q 1/0483; B60Q 1/0491; F16F 7/125; F16F 7/08
USPC .................................................. 248/569, 562
See application file for complete search history.

(56) References Cited

U.S. PATENT DOCUMENTS

| | | |
|---|---|---|
| 3,832,911 A | 9/1974 | Daniel et al. |
| 3,860,258 A | 1/1975 | Feustel et al. |
| 4,118,765 A | 10/1978 | Atsuchi |
| 4,616,522 A | 10/1986 | White et al. |
| 4,728,181 A | 3/1988 | Kakinuma |

(Continued)

FOREIGN PATENT DOCUMENTS

| | | |
|---|---|---|
| JP | 2000118291 A | 4/2000 |
| JP | 2003040136 A | 2/2003 |
| WO | WO2013082711 A1 | 6/2013 |

OTHER PUBLICATIONS

International Search Report and Written Opinion issued in connection with International Patent Application No. PCT/US2015/030643 on Aug. 21, 2015, 10 pages.

*Primary Examiner* — Todd M Epps
(74) *Attorney, Agent, or Firm* — McDonnell Boehnen Hulbert & Berghoff LLP

(57) ABSTRACT

An example apparatus includes (i) a mounting module configured to be coupled to a support frame of a vehicle, (ii) a component-support module configured to support a component of the vehicle, and (iii) a motion-guiding module coupled to the component-support module and the mounting module. The motion-guiding module is configured to guide motion of the component-support module toward the mounting module. The apparatus further includes (iv) a deformable tab coupled to the motion-guiding module. The deformable tab is configured to (a) in response to the deformable tab absorbing a force that is less than a predetermined level, resist motion of the component-support module toward the mounting module and (b) in response to the deformable tab absorbing a force that is greater than the predetermined level, deform to a position that allows the component-support module to move toward the mounting module in response to force applied to the component-support module.

20 Claims, 20 Drawing Sheets

(56) References Cited

U.S. PATENT DOCUMENTS

| | | | |
|---|---|---|---|
| 5,732,801 A | 3/1998 | Gertz | |
| 7,597,166 B2 | 10/2009 | Parks | |
| 7,798,526 B2 | 9/2010 | Lopez et al. | |
| 8,246,091 B1 | 8/2012 | Jayasuriya et al. | |
| 8,267,445 B1 | 9/2012 | Jayasuriya et al. | |
| 8,909,428 B1 | 12/2014 | Lombrozo | |
| 8,998,297 B1 | 4/2015 | Khaykin et al. | |
| 9,176,500 B1 | 11/2015 | Teller et al. | |
| 9,205,828 B1 * | 12/2015 | Lombrozo | B60W 30/00 |
| 2005/0052014 A1 * | 3/2005 | Lee | B62D 1/195 280/777 |
| 2005/0104391 A1 * | 5/2005 | Browne | B60R 19/03 293/132 |
| 2009/0034279 A1 | 2/2009 | Blandin et al. | |
| 2009/0115205 A1 | 5/2009 | Steller et al. | |
| 2012/0048056 A1 | 3/2012 | Matsu et al. | |
| 2013/0070471 A1 | 3/2013 | Pickholz | |
| 2013/0174368 A1 | 7/2013 | Mildner et al. | |
| 2015/0329037 A1 | 11/2015 | Lombrozo | |
| 2015/0330473 A1 * | 11/2015 | Lombrozo | F16F 6/005 248/569 |

* cited by examiner

APPARATUS FOR ABSORBING A FORCE

CROSS REFERENCE TO RELATED APPLICATION

This application is a continuation-in-part of U.S. patent application Ser. No. 14/276,086, filed on May 13, 2014, which is incorporated herein by reference.

BACKGROUND

Unless otherwise indicated herein, the materials described in this section are not prior art to the claims in this application and are not admitted to be prior art by inclusion in this section.

A vehicle can include features that provide structural support or functionality for the vehicle while also increasing driver or pedestrian safety.

SUMMARY

In one example, an apparatus includes (i) a mounting module configured to be coupled to a support frame of a vehicle, (ii) a component-support module configured to support a component of the vehicle, and (iii) a motion-guiding module coupled to the component-support module and the mounting module. The motion-guiding module is configured to guide motion of the component-support module toward the mounting module. The apparatus further includes (iv) a deformable tab coupled to the motion-guiding module. The deformable tab is configured to (a) in response to the deformable tab absorbing a force that is less than a predetermined level, resist motion of the component-support module toward the mounting module and (b) in response to the deformable tab absorbing a force that is greater than the predetermined level, deform to a position that allows the component-support module to move toward the mounting module in response to force applied to the component-support module.

In another example, a vehicle includes (i) a support frame, (ii) a mounting module coupled to the support frame, (iii) a component-support module configured to support a component of the vehicle, and (iv) a motion-guiding module coupled to the component-support module and the mounting module. The motion-guiding module is configured to guide motion of the component-support module toward the mounting module. The vehicle further includes (v) a deformable tab coupled to the motion-guiding module. The deformable tab is configured to (a) in response to the deformable tab absorbing a force that is less than a predetermined level, resist motion of the component-support module toward the mounting module and (b) in response to the deformable tab absorbing a force that is greater than the predetermined level, deform to a position that allows the component-support module to move toward the mounting module in response to force applied to the component-support module.

In yet another example, an apparatus includes (i) a mounting module configured to be coupled to a support frame of a vehicle, (ii) a headlight-support module configured to support a headlight of the vehicle, and (iii) a motion-guiding module coupled to the headlight-support module and the mounting module. The motion-guiding module is configured to guide motion of the headlight-support module toward the mounting module. The motion-guiding module or the mounting module comprises a magnet configured to absorb an impact force via an attractive magnetic force between the magnet and the motion-guiding module or the mounting module. The apparatus further includes (iv) a deformable tab coupled to the motion-guiding module. The deformable tab is configured to: (a) in response to the deformable tab absorbing a force that is less than a predetermined level, resist motion of the headlight-support module toward the mounting module and (b) in response to the deformable tab absorbing a force that is greater than the predetermined level, deform to a position that allows the headlight-support module to move toward the mounting module in response to force applied to the headlight-support module.

These as well as other aspects, advantages, and alternatives, will become apparent to those of ordinary skill in the art by reading the following detailed description, with reference where appropriate to the accompanying figures.

DETAILED DESCRIPTION

Figure 1:
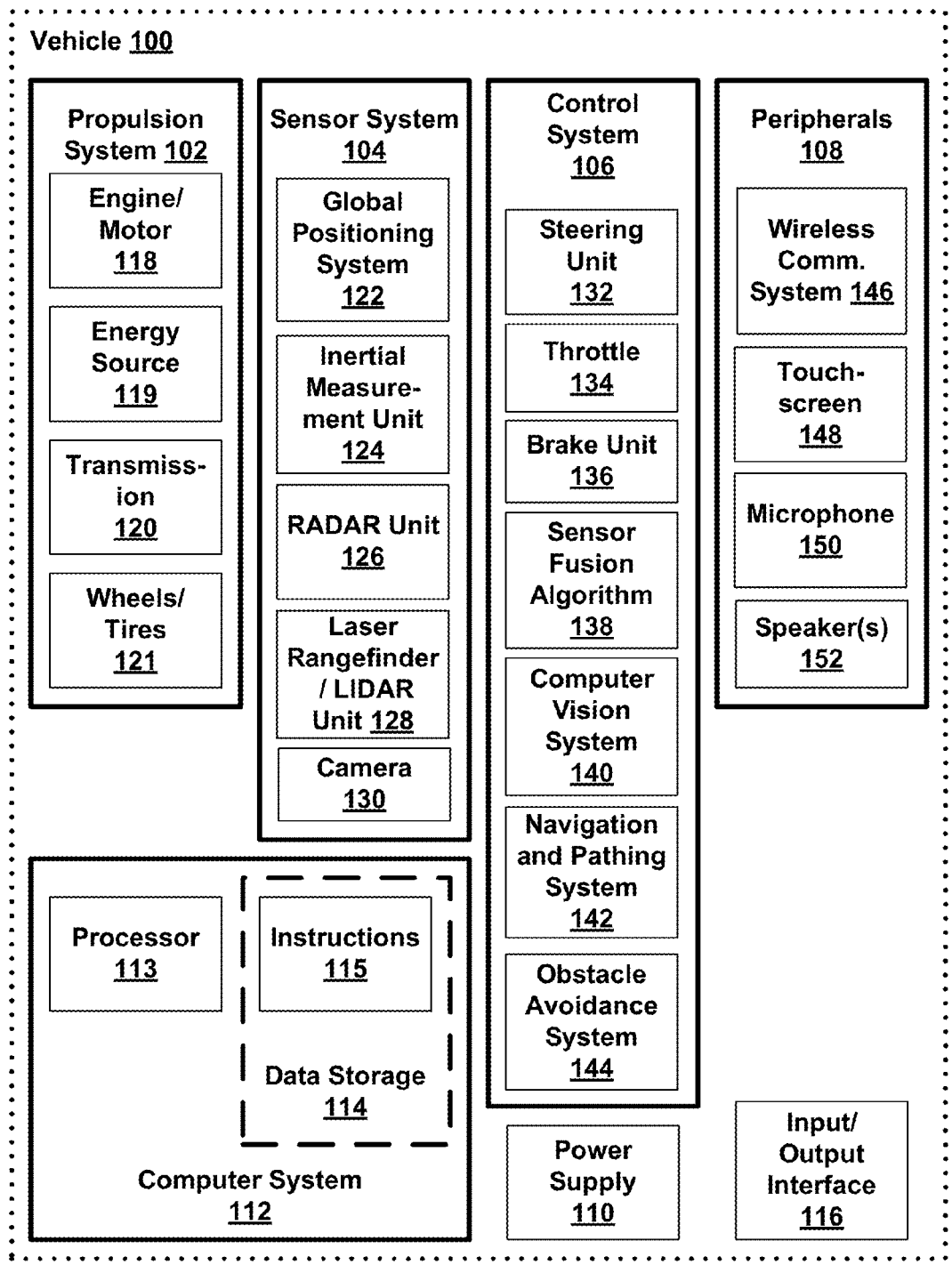
FIG. 1 is a functional block diagram illustrating a vehicle, according to an example embodiment.

The following Detailed Description describes various features and functions of the disclosed apparatus and vehicles with reference to the accompanying Drawings. In the Drawings, similar symbols identify similar components, unless context dictates otherwise. The illustrative apparatus and vehicle embodiments described herein are not meant to be limiting. It may be readily understood that certain aspects of the disclosed apparatus and vehicles can be arranged and combined in a wide variety of different configurations, all of which are contemplated herein.

In operation, it is possible that a vehicle may unexpectedly impact various objects such as roadway obstructions or other vehicles. In some cases, it is possible that the vehicle may even impact a pedestrian. To help avoid or mitigate injury to pedestrians, it may be useful to mount components of the vehicle (e.g., a headlight) upon an apparatus that is configured to absorb impact forces that may otherwise injure a pedestrian.

For example, a component of the vehicle may be mounted on an apparatus that is configured to retract the component when the component is impacted by other objects. However, unless the apparatus is properly configured the apparatus may undesirably retract the component when impacted by incidental levels of force that are not related to impact with a pedestrian. For instance, the apparatus may undesirably retract the component in response to driving over a bumpy driving surface.

Accordingly, an apparatus described herein may be configured to help avoid or mitigate potential injury to pedestrians while also helping to ensure that the component attached to the apparatus remains stationary during normal operating conditions. For instance, a first end of the apparatus may be mounted to a support frame of a vehicle and the component may be mounted to a second end of the apparatus. In response to absorbing a predetermined level of force, the apparatus may be configured to collapse such that the component retracts toward the support frame. More specifically, the apparatus may include at least one deformable tab that can be bent or otherwise set in a position to resist collapsing of the apparatus until the apparatus absorbs the predetermined level of force. Upon absorption of the predetermined level of force, the deformable tab may bend or otherwise deform to allow collapsing of the apparatus and retraction of the component toward the support frame and away from the source of the impact force.

Referring now to the figures, FIG. 1 is a functional block diagram illustrating a vehicle 100, according to an example embodiment. The vehicle 100 could be configured to operate fully or partially in an autonomous mode. For example, the vehicle 100 could be self-controlling while in the autonomous mode, and may be configured to determine a current state of the vehicle 100, determine an environment of the vehicle 100, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, and an input/output interface 116. The vehicle 100 may include more or fewer subsystems and each subsystem could include multiple elements. Further, each of the subsystems and elements of the vehicle 100 could be interconnected. Thus, one or more of the described functions of the vehicle 100 may be divided into additional functional or physical components, or combined into fewer functional or physical components. In some further examples, additional functional and/or physical components may be added to the examples illustrated by FIG. 1.

The propulsion system 102 may include components configured to provide motion for the vehicle 100. In an example embodiment, the propulsion system 102 could include an engine/motor 118, an energy source 119, a transmission 120, and wheels/tires 121. The engine/motor 118 could be any combination of an internal combustion engine, an electric motor, a steam engine, a Stirling engine, or other types of engines and/or motors. In some embodiments, the engine/motor 118 may be configured to convert the energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are configured to transmit mechanical power from the engine/motor 118 to the wheels/tires 121. To this end, the transmission 120 could include a gearbox, a clutch, a differential, and drive shafts. The transmission 120 could include other elements. The drive shafts could include one or more axles that could be coupled to the one or more wheels/tires 121.

The wheels/tires 121 of vehicle 100 could be configured in various formats, including a unicycle, a bicycle/motorcycle, a tricycle, or a car/truck four-wheel format. Other wheel/tire geometries are possible, such as those including six or more wheels. Any combination of the wheels/tires 121 of the vehicle 100 may be configured to rotate differentially with respect to other wheels/tires 121. The wheels/tires 121 could represent at least one wheel that is attached to the transmission 120 and at least one tire coupled to a rim of a wheel that could make contact with a driving surface. The wheels/tires 121 could include any combination of metal and rubber, or another combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., an O2 monitor, a fuel gauge, or an engine oil pressure gauge). Other sensors are possible as well.

One or more of the sensors included in the sensor system 104 could be configured to be actuated separately and/or collectively in order to modify a position and/or an orientation of the one or more sensors.

The Global Positioning System (GPS) 122 may be any sensor configured to determine a location of the vehicle 100. To this end, the GPS 122 could include a transceiver configured to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the environment of the vehicle 100. In some embodiments, in addition to sensing the objects, the RADAR unit 126 may additionally be configured to sense the speed and/or direction of motion of the objects.

Similarly, the laser rangefinder/LIDAR unit 128 may be any sensor configured to sense objects in the environment of the vehicle 100 by using lasers. In an example embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be configured to captures still frames and/or continuous video.

The control system 106 may be configured to control operation of the vehicle 100 and its components. Accordingly, the control system 106 could include various elements including a steering unit 132, a throttle 134, a brake unit 136, a sensor fusion algorithm 138, a computer vision system 140, a navigation and pathing system 142, and an obstacle avoidance system 144.

The steering unit 132 could represent any combination of mechanisms that may be configured to adjust a direction of motion of the vehicle 100. For example, a steering wheel or steering column may be mechanically coupled to the wheels/tires 121 and turning the steering wheel or steering column may cause the wheels/tires 121 to change the direction of motion of the vehicle 100.

The throttle 134 could be configured to control, for instance, the operating speed of the engine/motor 118 and, in turn, control the speed of the vehicle 100. For example, the throttle 134 may be configured to increase or decrease a rate of energy conversion of the energy source 119 that is converted to mechanical energy by the engine/motor 118.

The brake unit 136 could include any combination of mechanisms configured to decelerate the vehicle 100. The brake unit 136 could use disc or drum brakes that use friction to slow rotation of the wheels/tires 121. In other embodiments, the brake unit 136 could convert kinetic energy of the wheels/tires 121 to electric current. The brake unit 136 may take other forms as well.

The sensor fusion algorithm 138 may be an algorithm configured to accept data from the sensor system 104 as an input. (The sensor fusion algorithm 138 may be data representing the sensor fusion algorithm stored in the data storage 114.) The input data may include, for example, data representing information sensed by the sensors of the sensor system 104. The sensor fusion algorithm 138 could include, for instance, a Kalman filter, a Bayesian network, or another algorithm. The sensor fusion algorithm 138 could further provide various assessments based on the data from the sensor system 104. In an example embodiment, the assessments could include evaluations of individual objects and/or features in the environment of vehicle 100, an evaluation of a particular situation, or evaluations of possible impacts based on the particular situation. Other assessments are possible.

The computer vision system 140 may be any system configured to process and analyze images captured by the camera 130 in order to identify objects or features in the environment of vehicle 100, including traffic signals, roadway boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, or estimate the speed of objects.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to receive input data or provide outputs, including to or from external sensors, other vehicles, and other computer systems. For example, peripherals 108 could include a wireless communication system 146, a touchscreen 148, a microphone 150, and a speaker 152.

In one example, the wireless communication system 146 could be configured to wirelessly communicate with one or more devices directly or via a communication network. For example, the wireless communication system 146 could use 3G cellular communication, such as CDMA, EVDO, GSM/GPRS, or 4G cellular communication, such as WiMAX or LTE. Alternatively, the wireless communication system 146 could communicate with a wireless local area network (WLAN), for example, using WiFi. In some embodiments, the wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

In an example embodiment, the touchscreen 148 may be configured to display information, including information describing a state of the vehicle 100. The input/output interface 116 could also be configured to accept input from the touchscreen 148. The touchscreen 148 may be configured to sense a position and/or a movement of a finger via capacitive sensing, resistance sensing, or a surface acoustic wave process, among other possibilities. The touchscreen 148 may be capable of sensing finger movement in a direction parallel or planar to the touchscreen surface, or in a direction normal to the touchscreen surface, and may also be capable of sensing a level of pressure applied to the surface of the touchscreen 148. The touchscreen 148 may be formed of one or more translucent or transparent insulating layers and one or more translucent or transparent conducting layers. The touchscreen 148 may take other forms as well.

The microphone 150 may be configured to detect sound waves (e.g., a voice command) and convert the sound waves into audio signals for use by the computer system 112. Similarly, the speakers 152 may be configured to receive audio signals and convert the audio signals into sound waves.

The power supply 110 may provide power to various components of the vehicle 100 and could represent, for example, a rechargeable lithium-ion or lead-acid battery. In some embodiments, one or more banks of such batteries could be configured to provide electrical power to the vehicle 100. Other power supply components and configurations are possible. In some embodiments, the power supply 110 and the energy source 119 could be implemented together, as in some all-electric cars.

Many or all of the functions of the vehicle 100 could be controlled by the computer system 112. The computer system 112 may include at least one processor 113 (which could include at least one microprocessor) that executes the instructions 115 stored in a non-transitory computer readable medium, such as the data storage 114. The computer system 112 may also represent a plurality of processors or computing devices that may serve to control individual components or subsystems of the vehicle 100 in a distributed fashion.

In some embodiments, the data storage 114 may contain the instructions 115 (e.g., program logic) executable by the processor 113 to execute various functions of vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The computer system 112 may control the function of the vehicle 100 based on inputs received from various subsystems (e.g., the propulsion system 102, the sensor system 104, and the control system 106), as well as from the input/output interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be configured to provide control over many aspects of the vehicle 100 and its subsystems.

The vehicle 100 may include an input/output interface 116 for providing information for output or receiving input from the peripherals 108. The input/output interface 116 could control or enable control of content and/or a layout of interactive images that could be displayed on the touchscreen 148. Further, the input/output interface 116 could include one or more input/output devices within the set of peripherals 108, such as the wireless communication system 146, the touchscreen 148, the microphone 150, and the speaker 152.

Although FIG. 1 shows various components of the vehicle 100, i.e., the wireless communication system 146, the computer system 112, the data storage 114, and the input/output interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
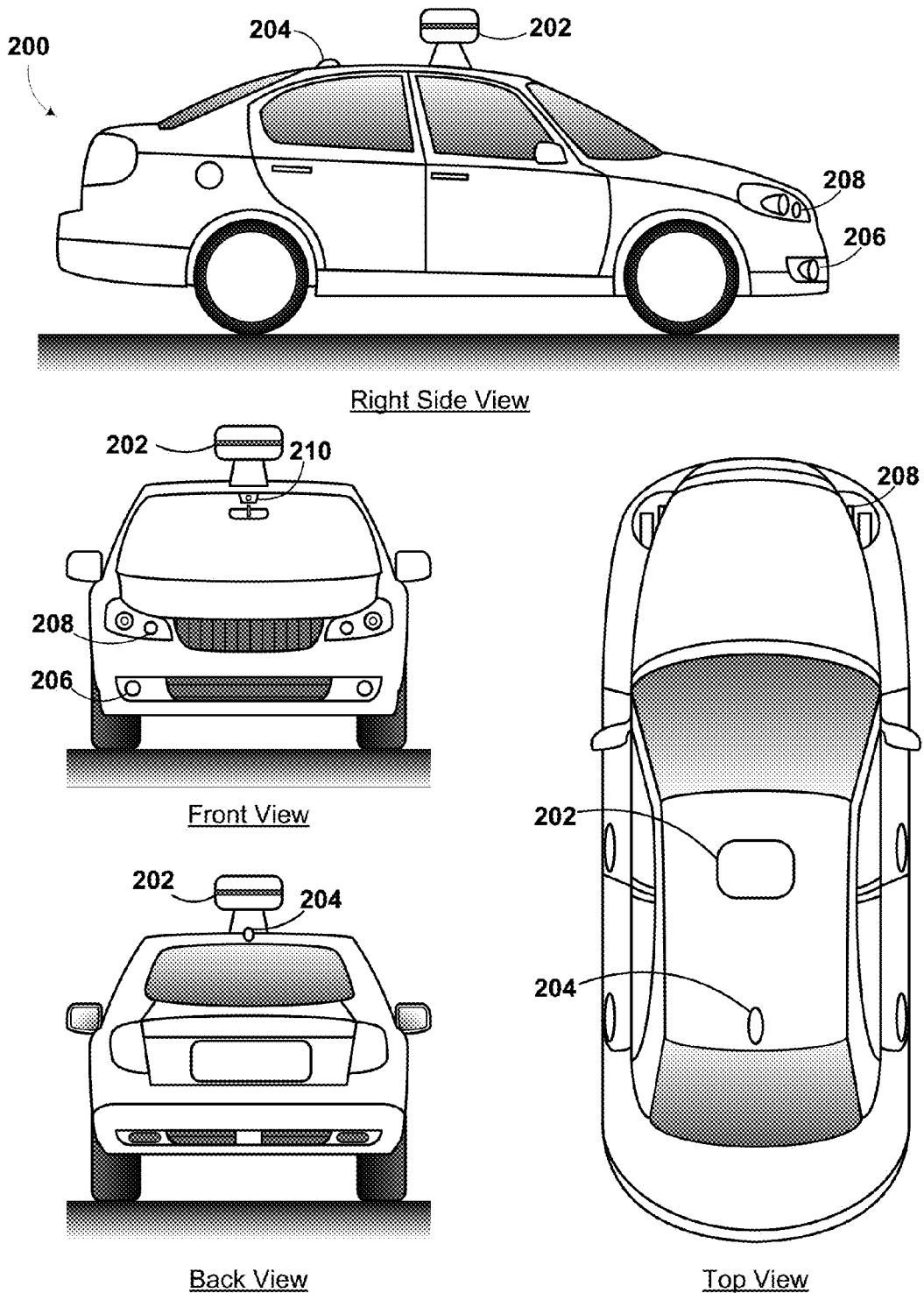
FIG. 2 depicts an example vehicle.

FIG. 2 depicts an example vehicle 200 that could be similar to the vehicle 100 described in FIG. 1. Although the vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

In some embodiments, the vehicle 200 could include a sensor unit 202, a wireless communication system 204, a LIDAR unit 206, a laser rangefinder unit 208, and a camera 210. The elements of the vehicle 200 could include some or all of the elements described as part of the vehicle 100, depicted in FIG. 1.

The sensor unit 202 could include one or more different sensors configured to capture information about an environment of the vehicle 200. For example, the sensor unit 202 could include any combination of cameras, RADARs, LIDARs, range finders, and acoustic sensors. Other types of sensors are possible. In an example embodiment, the sensor unit 202 could include one or more movable mounts that could be configured to adjust the orientation of one or more sensors in the sensor unit 202. In one embodiment, the movable mount could include a rotating platform that could scan sensors so as to obtain information from many directions around the vehicle 200. In another embodiment, the movable mount of the sensor unit 202 could be moveable in a scanning fashion within a particular range of angles and/or azimuths. The sensor unit 202 could be mounted atop a roof of the vehicle 200, for instance, however other mounting locations are possible. Additionally, the sensors of the sensor unit 202 could be distributed in different locations and need not be in a single location. Some possible sensor types and mounting locations include the LIDAR unit 206 and the laser rangefinder unit 208, as depicted in FIG. 2. Furthermore, each sensor of the sensor unit 202 could be configured to be moved or scanned independently of other sensors of the sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of an electromagnetic spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern from the object. Based on distortions in the reflected light pattern, the vehicle 200 may determine the distance to the points on the object. The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 may use the camera 210 to detect a reflection of the laser from various points of the object. Based on a length of time it takes the laser to reflect from the object at various points, the vehicle 200 may determine the distance to the points on the object. As yet another example, the camera 210 may use a time-of-flight technique in which the vehicle 200 emits a light pulse and uses the camera 210 to detect a reflection of the light pulse from an object at a number of points on the object. In particular, the camera 210 may include a number of pixels, and respective pixels may detect the reflection of the light pulse from a point on the object. Based on a length of time it takes the light pulse to reflect from the object at various points, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated in FIG. 2, the camera 210 could capture images from a forward-looking view with respect to the vehicle 200. Other mounting locations and viewing angles of camera 210 are possible, either inside or outside the vehicle 200.

The camera 210 could have associated optics that could be configured to provide an adjustable field of view. Further, the camera 210 could be mounted to vehicle 200 with a movable mount that could be configured to vary a pointing angle of the camera 210.

Figure 3:
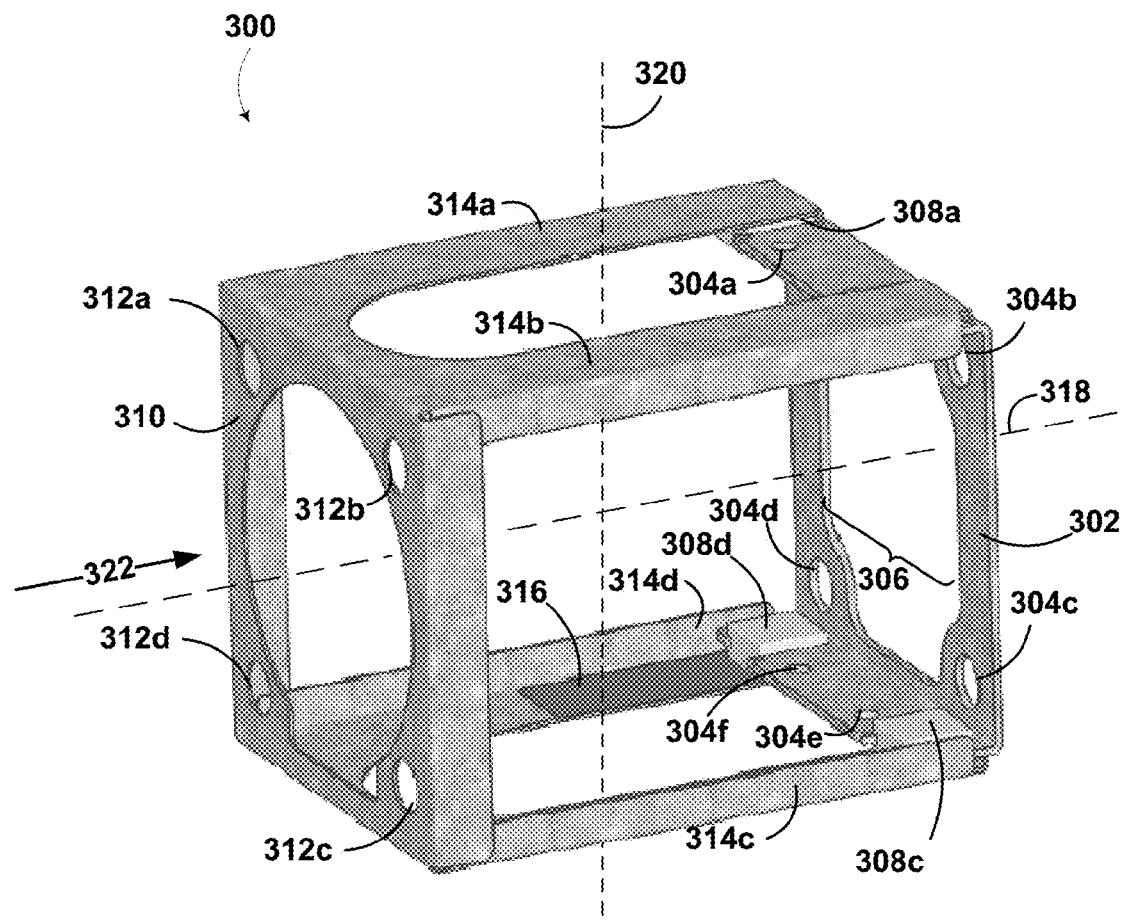
FIG. 3 illustrates an example system for absorbing an impact force.

FIG. 3 illustrates an example system 300 in accordance with at least some embodiments disclosed herein. FIG. 3 includes a mounting module 302, holes 304a, 304b, 304c, 304d, 304e, and 304f, a receiving area 306, magnets 308a, 308c, and 308d, an object-support module 310, mounting holes 312a, 312b, 312c, and 312d, a motion-guiding module comprising rails 314a, 314b, 314c, and 314d, a friction strip 316, a first axis 318 of the system 300, a second axis 320 of the system 300, and a threshold force 322.

A portion of the mounting module 302 may be a plate-like apparatus comprising the holes 304a-f and the receiving area 306. The mounting module 302 may be made of metal or other materials configured to bear loads and could further include the magnets 308a, 308c, and 308d (hereinafter magnets 308a-d). In other examples, the magnets 308a-d could be included as part of the object-support module 310. The magnets 308a-d may be configured to respectively apply an attractive magnetic force to the rails 314a-d of the motion-guiding module.

The mounting module 302 may be configured to be coupled to a support frame, such as a support frame of a car, boat, or airplane, for example. The mounting module 302 may be coupled to the support frame via bolts or screws that pass through the holes 304a-f. In other examples, the holes 304b-d may be used for tool access, such as for adjusting a headlight. (See FIG. 9 for an illustration of an example mounting module mounted to a support frame of a vehicle.) Other fastener examples are possible. In some embodiments, some of the holes 304a-f may instead be used to allow portions of an object supported by the object-support module 310 to pass through the holes 304a-f. Other examples are possible.

The receiving area 306 may be configured to allow at least a portion of an object (not pictured) supported by the object-support module 310 to pass through the receiving area 306. For example, a portion of an object such as a vehicle headlight coupled to the object-support module 310 (or a hose or wiring attached to the headlight) may be configured to pass through the receiving area 306 as the object-support module 310 or the vehicle headlight moves toward the mounting module 302. Such motion may occur in response to the threshold force 322 being applied to the vehicle headlight or the object-support module 310. For instance, the threshold force 322 may impact an illuminating end of the vehicle headlight, causing the vehicle headlight and the object-support module 310 to move rightward (as depicted in FIG. 3) toward the mounting module 302. Here, a back non-illuminating end of the vehicle headlight may pass through the receiving area 306. (See FIG. 10 for a more detailed depiction of a portion of an object passing through a receiving area in response to an impact force.)

The object-support module 310 may be configured to be coupled to, and to support, an object such as a headlight, sensor, or other vehicle component. (See FIG. 9 or 10 for an illustration of an example object mounted to an object-support module.) The object-support module 310 may be made of metal or other materials configured to bear loads and may be coupled to the object via bolts or screws that pass through the mounting holes 312a-d. Other fastener examples are possible. The object-support module 310 may be fixedly coupled to the rails 314a-d of the motion-guiding module. The object-support module 310 and the rails 314a-d may be configured to move together with respect to the mounting module 302. (In other examples, the mounting module 302 and the rails 314a-d of the motion-guiding module may be fixedly coupled and configured to move together relative to the object-support module 310.) As shown in FIG. 3, the object-support module 310 and the rails 314a-d are formed from a single piece of metal, but in other examples the object-support module 310 and the rails 314a-d of the motion-guiding module may be separate pieces that are coupled together via bolts, screws, or other fasteners.

The rails 314a-d of the motion-guiding module may be coupled to the object-support module 310 and the mounting module 302. As depicted in FIG. 3, the rails 314a-d may be fixedly coupled to the object-support module 310 and movably coupled to the mounting module 302. In other examples, the rails 314a-d may be fixedly coupled to the mounting module 302 and movably coupled to object-support module 310.

The rails 314a-d of the motion-guiding module may be configured to guide motion of the object-support module 310 along a first axis 318 of the system 300 toward the mounting module 302 in response to the threshold force 322 applied to the object-support module 310 along the first axis 318. The rails 314a-d of the motion-guiding module may be configured to resist motion of the object-support module 310 along a second axis 320 of the system 300 that is perpendicular to the first axis 318 of the system 300. In FIG. 3, the second axis 320 is depicted as substantially vertical, but the second axis 320 may represent any axis that is perpendicular to the first axis 318. For instance, the rails 314a-d may guide motion of the object-support module 310 along the first axis 318 in response to a force applied to the object-support module 310 along the first axis 318, but if a downward force is applied to the object-support module 310 along the second axis 320, the rails 314a-b located on a top side of the motion-guiding module may resist (pull against) downward movement of the object-support module 310 and the rails 314c-d located on a bottom side of the motion-guiding module may resist (push against) downward movement of the object-support module 310. However, if a sufficient force component is applied to the object-support module 310 in a direction parallel to the second axis 320, the rails 314a-d may deform somewhat to absorb the force component parallel to the second axis 320. The rails 314a-d and the magnets 308a-d may absorb various force components and allow for rotational deformation of the rails 314a-d which may prevent the system 300 from binding and preventing motion of the object-support module 310 in cases where an impact force is not completely aligned with the first axis 318.

The rails 314a-d of the motion-guiding module may be configured to absorb impact forces applied to the object-support module 310 along the first axis 318. The rails 314a-d may also absorb impact forces that are not entirely aligned with the first axis 318. Components of such impact forces may be aligned with the first axis 318. The magnets 308a-d may exert an attractive magnetic force to respective rails 314a-d of the motion-guiding module that tends to resist motion of the object-support module 310 and the motion-guiding module relative to the mounting module 302. In examples where the magnets 308a-d are included as part of the object-support module 310, the magnets 308a-d may exert an attractive magnetic force to respective rails 314a-d of the motion-guiding module that tends to resist motion of the mounting module 302 and the rails 314a-d of the motion-guiding module relative to the object-support module 310. In one example, the mounting module 302 may include three magnets 308a, 308c, and 308d each corresponding to respective rails 314a, 314c, and 314d of the motion-guiding module. The mounting module 302 may also include a fourth magnet (not pictured) corresponding to the rail 314b. Other examples are possible.

Also, the rails 314a-d of the motion-guiding module may include at least one friction strip 316. In one example, the motion-guiding module may include four friction strips 316 each corresponding to a respective rails 314a-d of the motion-guiding module. The friction strip(s) 316 may include friction tape or other adhesive materials configured to enhance friction between the mounting module 302 and the respective rails 314a-d of the motion-guiding module. In other examples, the friction strip(s) 316 may enhance friction between the object-support module 310 and the rails 314a-d. The friction strip(s) 316 could also include a friction-inducing material coating or treatment on the rails 314a-d, whereby a coefficient of friction between the rails 314a-d and the mounting module 302 may vary as the mounting module 302 moves along the first axis with respect to the rails 314a-d. As the magnets 308a-d or other portions of the mounting module 302 move across the friction strip(s) 316, kinetic energy of the rails 314a-d or the object-support module 310 may be converted into friction-induced heat. In another example, the rails 314a-d of the motion-guiding module may not include the friction strip(s) 316 and the magnets 308a-d may generate friction as the magnets 308a-d move against the respective rails 314a-d of the motion-guiding module. Other examples are possible.

The magnets 308a-d of the mounting module 302 may apply a substantially constant attractive (magnetic) force substantially along the second axis 320 of the system 300 to respective rails 314a-d of the motion-guiding module while the object-support module 310 is at any position along the first axis 318 of the system 300. Substantially along the second axis 320 may include a range of angles such as parallel with the second axis 320 plus or minus 5 degrees. The force respectively applied by the magnets 308a-d to the rails 314a-d of the motion-guiding module may be substantially constant because positions of the magnets 308a-d with respect to the rails 314a-d of the motion-guiding module along the second axis 320 may not substantially change as the object-support module 310 moves along the first axis 318. The substantially constant force applied by the magnets 308a-d may resist motion of the object-support module 310 along the first axis 318 of the system 300. For example, the substantially constant attractive force may enhance friction between the rails 314a-d of the motion-guiding module and the magnets 308a-d, or movement of the object-support module 310 along the first axis 318 may cause the attractive force between the magnets 308a-d and the rails 314a-d of the motion-guiding module to become aligned slightly off-axis from the second axis 320, such that a component of the attractive force resists motion of the object-support module 310 along the first axis 318.

In another example, the rails 314a-d may include portions of increased thickness (not shown) compared to other portions of the rails 314a-d. For example, respective rightward end portions of the rails 314a-d may include portions of increased thickness (with reference to the second axis 320) compared to other portions of the rails 314a-d. This may cause the attractive magnetic force between the magnets 308a-d and the rails 314a-d to be greater when the object-support module 310 is at a fully leftward position as compared to when the object-support module 310 and the rails 314a-d have moved some distance rightward toward the mounting module 302. In such an example, the rails 314a-d of the motion-guiding module may provide an increased force resisting motion of the object-support module 310 when the object-support module 310 is at a fully leftward position, as compared to when the object-support module 310 is at other positions along the first axis 318. The magnetic force resisting motion of the object-support module 310 along the first axis 318 may decrease as the magnets 308a-d break contact with the portions of the rails 314a-d having increased thickness. Portions of increased thickness could similarly be included at other portions of the rails 314a-d to provide an increased magnetic force between the magnets 308a-d and the rails 314a-d as the object-support module 310 reaches any point of motion along the first axis 318.

Figure 4:
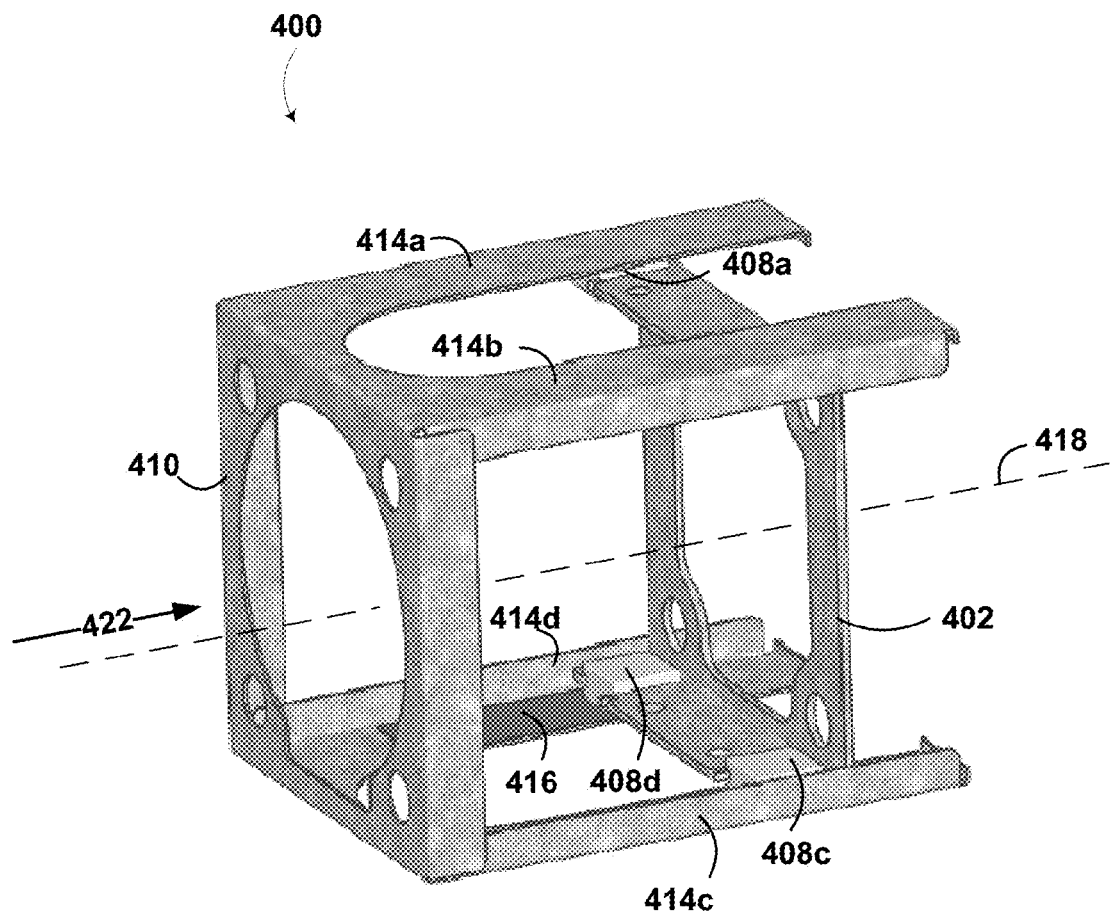
FIG. 4 illustrates an example system for absorbing an impact force.

FIG. 4 illustrates an example system 400 in accordance with at least some embodiments disclosed herein. FIG. 4 includes a mounting module 402, magnets 408a, 408c, and 408d, an object-support module 410, a motion-guiding module comprising rails 414a, 414b, 414c, and 414d, a friction strip 416, a first axis 418 of the system 400, and a threshold force 422.

FIG. 4 may depict the system 400 after the threshold force 422 has been applied to the object-support module 410. In FIG. 4, the object-support module 410 and the rails 414a-d of the motion-guiding module have moved along the first axis 418 of the system 400 in response to the threshold force 422 being applied to the object-support module 410 (in a rightward direction as depicted in FIG. 4). The object-support module 410 and the rails 414a-d of the motion-guiding module may be configured to move closer to the mounting module 402 than shown in FIG. 4. For instance, the object-support module 410 and the rails 414a-d of the motion-guiding module may be configured to move toward the mounting module 402, in response to the threshold force 422, until the object-support module 410 comes into contact with the mounting module 402. FIG. 4 may depict the system 400 after the magnets 408a, 408c, and 408d or the friction strip(s) 416 have absorbed a force applied to the object-support module 410 along the first axis 418.

Figure 5:
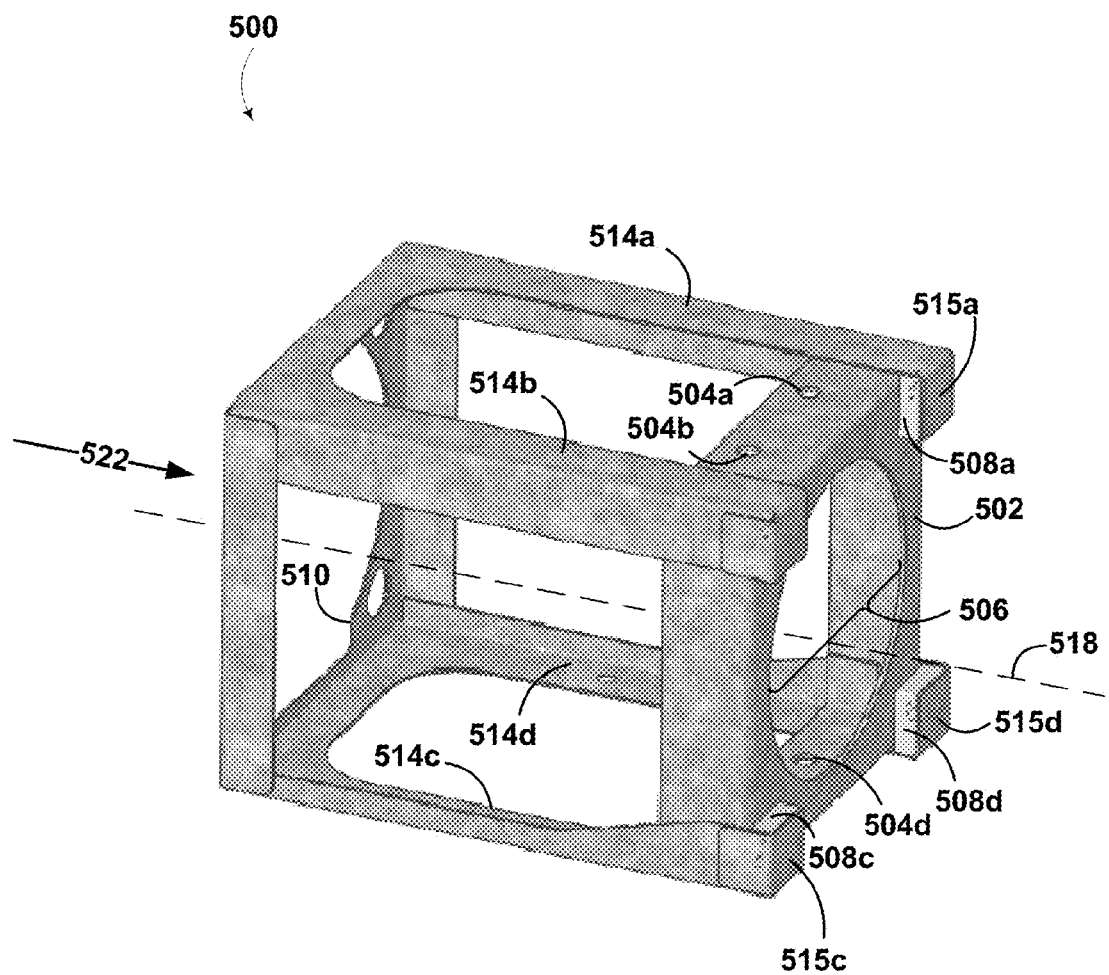
FIG. 5 illustrates an example system for absorbing an impact force.

FIG. 5 illustrates an example system 500 in accordance with at least some embodiments disclosed herein. FIG. 5 includes a mounting module 502, mounting holes 504a, 504b, 504d, a receiving area 506, magnets 508a, 508c, and 508d, an object-support module 510, a motion-guiding module comprising rails 514a, 514b, 514c, and 514d and back tabs 515a, 515c, and 515d, a first axis 518 of the system 500, and a threshold force 522.

The system 500 may be similar to systems 300 and 400 respectively depicted in FIGS. 3 and 4. For example, the mounting module 502 may be coupled to a support frame via fasteners and the mounting holes 504a, 504b, and 504d. Also, the receiving area 506 may be configured to allow an object (not shown) supported by the object-support module 510 to pass through the receiving area 506. Further, the object-support module 510 may move toward the mounting module 502 in response to the threshold force 522 being applied to the object-support module 510. However, the mounting module 502 may include magnets 508a, 508c, and 508d (hereinafter 508a-d) that apply an attractive magnetic force to the rails 514a-d of the motion-guiding module along the first axis 518 of the system 500. For instance, the magnets 508a-d may respectively apply attractive magnetic forces to back tabs 515a, 515c, and 515d (hereinafter 515a-d) of the motion-guiding module 514. The respective attractive forces applied by the magnets 508a-d to the back tabs 515a-d of the motion-guiding module 514 may decrease in magnitude as the magnets 508a-d lose contact with the back tabs 515a-d. Also, the magnets 508a-d may move away from the back tabs 515a-d as the object-support module 510 moves closer to the mounting module 502, also causing a decrease in magnitude of the attractive force between the magnets 508a-d and the back tabs 515a-d of the rails 514a-d of the motion-guiding module. The magnetic force applied by the magnets 508a-d to the rails 514a-d of the motion-guiding module may resist motion of the object-support module 510 along the first axis 518. In some examples, the magnets 508a-d may be included as part of the motion-guiding module and not the mounting module 502, but may otherwise have similar functionality in resisting motion of the object-support module 510 along the first axis 518. Other examples are possible.

Figure 6:
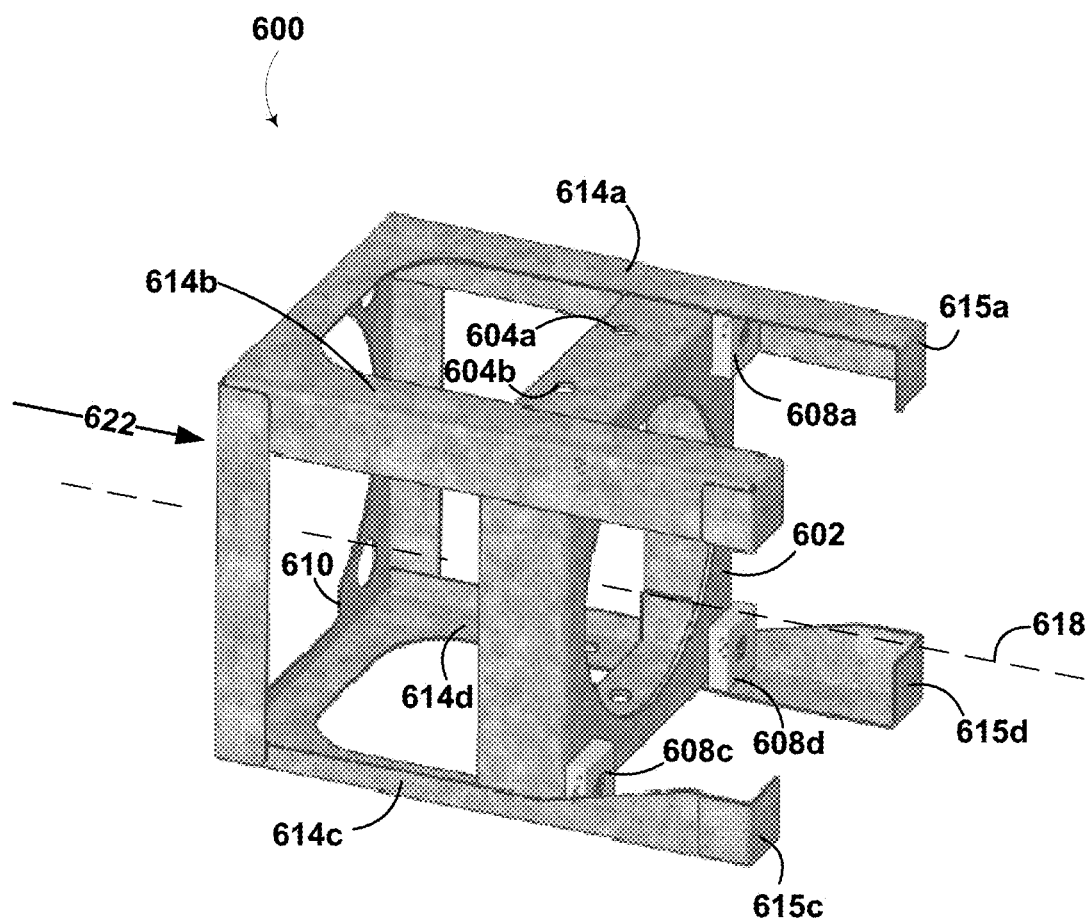
FIG. 6 illustrates an example system for absorbing an impact force.

FIG. 6 illustrates an example system 600 in accordance with at least some embodiments disclosed herein. FIG. 6 includes a mounting module 602, mounting holes 604a and 604b, magnets 608a, 608c, and 608d, an object-support module 610, a motion-guiding module comprising rails 614a, 614b, 614c, and 614d, back tabs 615a, 615c, and 615d, a first axis 618 of the system 600, and a threshold force 622.

FIG. 6 may depict the system 600 after the threshold force 622 has been applied to the object-support module 610. In FIG. 6, the object-support module 610 and the rails 614a-d of the motion-guiding module have moved along the first axis 618 of the system 600 in response to the threshold force 622 being applied to the object-support module 610 (in a rightward direction as depicted in FIG. 6). The object-support module 610 and the rails 614a-d of the motion-guiding module may be configured to move even closer to the mounting module 602 than shown in FIG. 6. For instance, the object-support module 610 and the rails 604a-d of the motion-guiding module may be configured to move toward the mounting module 602, in response to an applied force, until the object-support module 610 comes into contact with the mounting module 602. FIG. 6 may depict the system 600 after the magnets 608a, 608c, and 608d have absorbed a force applied to the object-support module 610 applied along the first axis 618. The system 600 may be different from other example systems disclosed herein, in that once the magnets 608a, 608c, and 608d break contact with the back tabs 615a, 615c, and 615d, the threshold force 622 sufficient to move the object-support module 610 toward the mounting module 602 may decrease.

Figure 7:
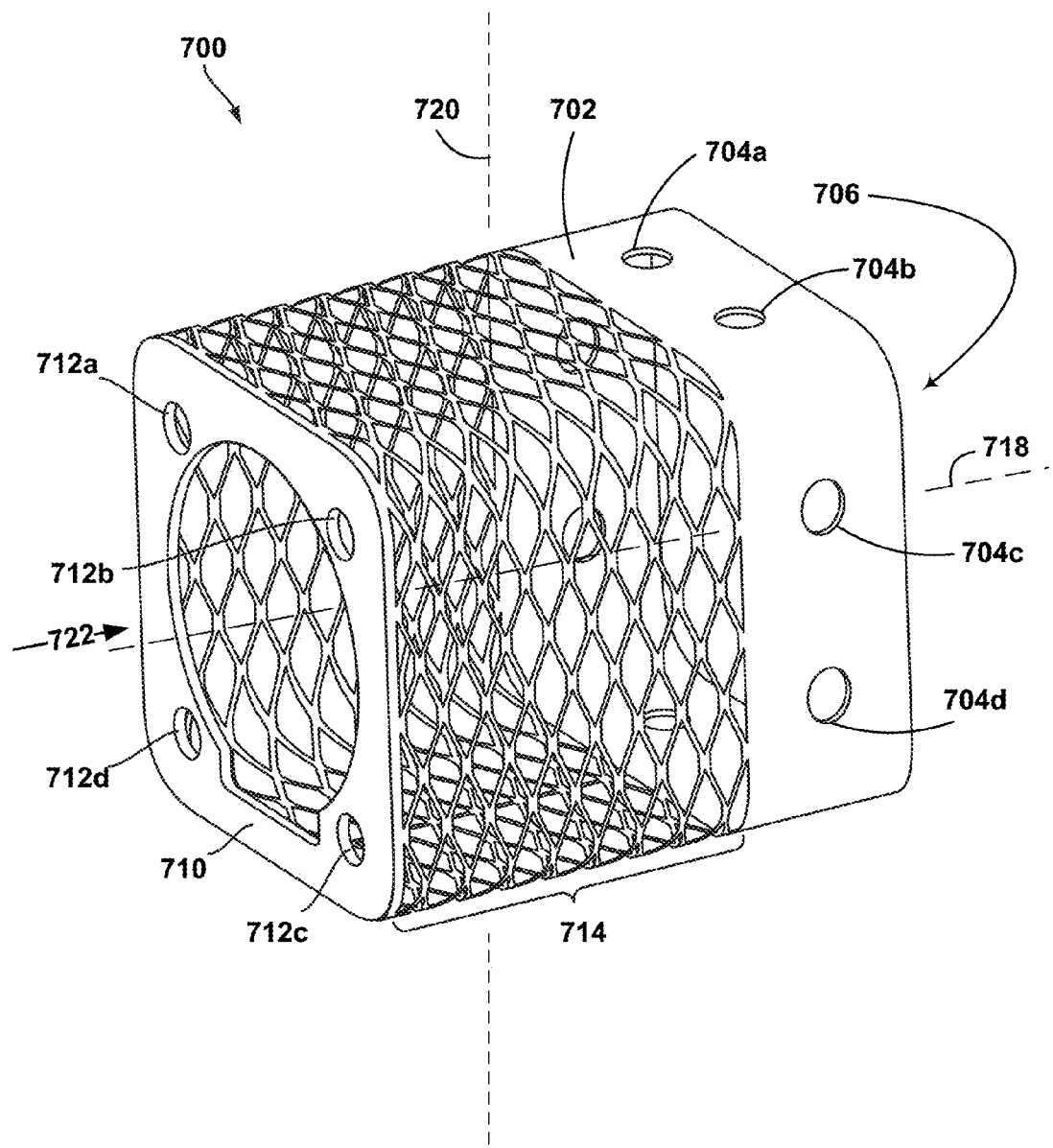
FIG. 7 illustrates an example system for absorbing an impact force.

FIG. 7 illustrates an example system 700 in accordance with at least some embodiments disclosed herein. The system 700 includes a mounting module 702, mounting holes 704a, 704b, 704c, and 704d, a receiving area 706, an object-support module 710, mounting holes 712a, 712b, 712c, and 712d, a motion-guiding module 714, a first axis 718 of the system 700, a second axis 720 of the system 700, and a threshold force 722.

A portion of the mounting module 702 may be a plate-like apparatus similar to the mounting module 302 of FIG. 3, or may be a collar-like apparatus comprising the mounting holes 704a-d and the receiving area 706 as depicted in FIG. 7. The mounting module 702 may be made of metal or other materials configured to bear loads and may be configured to be coupled to a support frame, such as a support frame of a car, boat, or airplane, for example. The mounting module 702 may be coupled to the support frame via bolts or screws that pass through the mounting holes 704a-d. Other fastener examples are possible. The receiving area 706 may be defined by a portion of a plane encircled by the mounting module 702 and may be configured to allow at least a portion of an object (not shown) supported by the object-support module 710 to pass through the receiving area 706. For example, a portion of an object such as a vehicle headlight may be configured to pass through the receiving area 706 as the object-support module 710 or the vehicle headlight moves toward the mounting module 702.

The object-support module 710 may be configured to be coupled to, and to support, an object such as a headlight, sensor, or other vehicle component. The object-support module 710 may be made of metal or other materials configured to bear loads and may be coupled to the object via bolts or screws that pass through the mounting holes 712a-d. Other fastener examples are possible. The object-support module 710 may be fixedly coupled to the motion-guiding module 714 and may be configured to move with respect to the mounting module 702 when the threshold force 722 is applied to the object-support module 710 along the first axis 718.

The motion-guiding module 714 may be coupled to the object-support module 710 and the mounting module 702. The motion-guiding module 714 may include a mesh or cage-like section configured to guide motion of the object-support module 710 along a first axis 718 of the system 700 toward the mounting module 702 in response to the threshold force 722 applied to the object-support module 710 along the first axis 718. For example, as the threshold force 722 is applied, the motion-guiding module 714 may compress or crush to allow the object-support module 710 to move toward the mounting module 702. In contrast, if a force weaker than the threshold force 722 is applied to the object-support module 710, the motion-guiding module 714 may resist motion of the object-support module 710 along the first axis 718. The motion-guiding module 714 may also be configured to resist motion of the object-support module 710 along a second axis 720 of the system 700 that is perpendicular to the first axis 718 of the system 700. In FIG. 7, the second axis 720 is depicted as substantially vertical, but the second axis 720 may represent any axis that is perpendicular to the first axis 718. For instance, the motion-guiding module 714 may guide motion of the object-support module 710 along the first axis 718 in response to a force applied to the object-support module 710 along the first axis 718, but if a downward force is applied to the object-support module 710, portions of the motion-guiding module 714 located on a top side of the motion-guiding module 714 may resist (pull against) downward movement of the object-support module 710 and portions of the motion-guiding module 714 located on a bottom side of the motion-guiding module 714 may resist (push against) downward movement of the object-support module 710.

The motion-guiding module 714 may be configured to absorb impact forces applied to the object-support module 710 along the first axis 718. For example, kinetic energy of the object-support module 710 may be absorbed as the motion-guiding module 714 is compressed or crushed to allow the object-support module 710 to move toward the mounting module 702. Such impact forces may include forces not completely aligned with the first axis 718 but that do include a component force aligned with the first axis 718.

Figure 8:
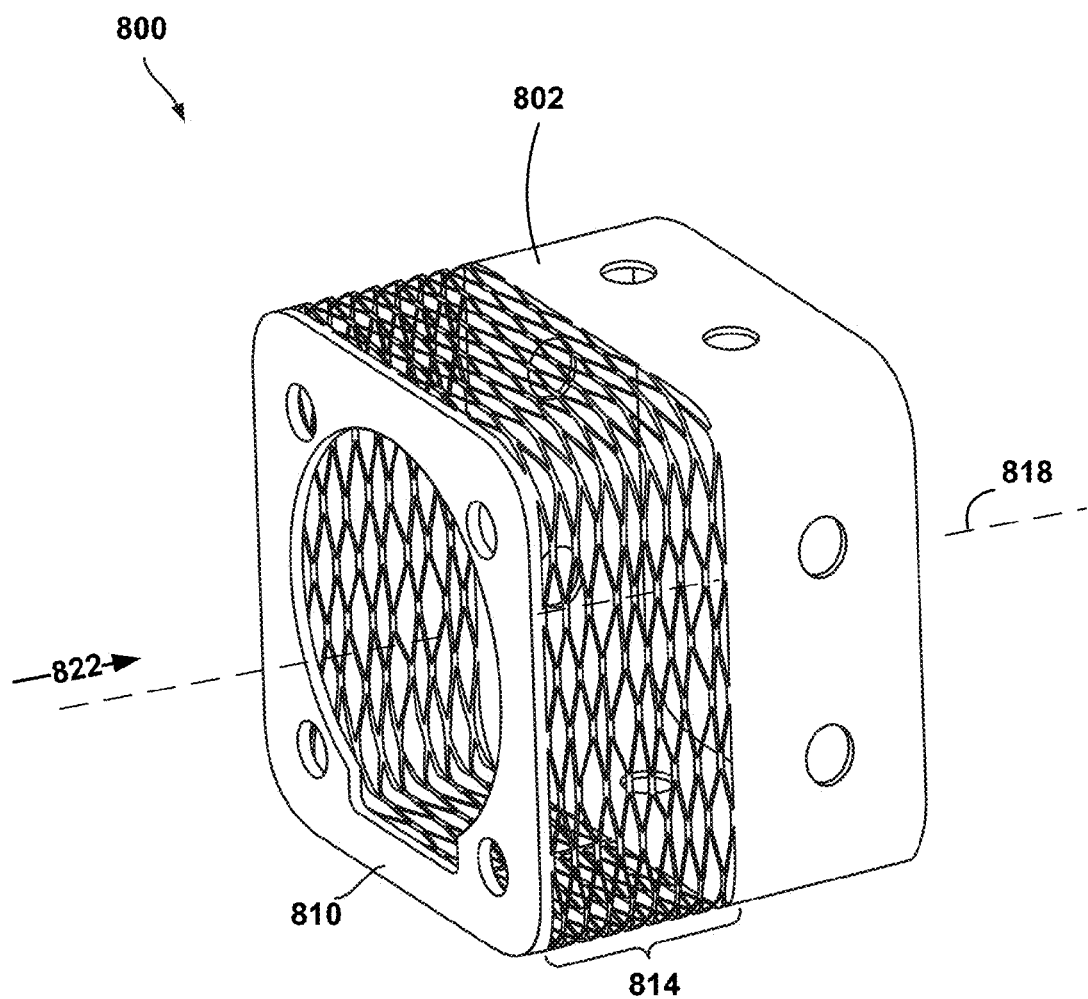
FIG. 8 illustrates an example system for absorbing an impact force.

FIG. 8 illustrates an example system 800 in accordance with at least some embodiments disclosed herein. The system 800 includes a mounting module 802, an object-support module 810, a motion-guiding module 814, a first axis 818 of the system 800, and a threshold force 822.

FIG. 8 may depict the system 800 after the threshold force 822 has been applied to the object-support module 810. In FIG. 8, the object-support module 810 has moved along the first axis 818 of the system 800 in response to the threshold force 822 being applied to the object-support module 810 (in a rightward direction as depicted in FIG. 8). The threshold force 822 may cause the motion-guiding module 814 to compress or crush, allowing the object-support module 810 to move toward the mounting module 802. The object-support module 810 may be configured to move even closer to the mounting module 802 than shown in FIG. 8. FIG. 8 may depict the system 800 after the motion-guiding module 814 absorbed a force applied to the object-support module 810 applied along the first axis 818.

Figure 9:
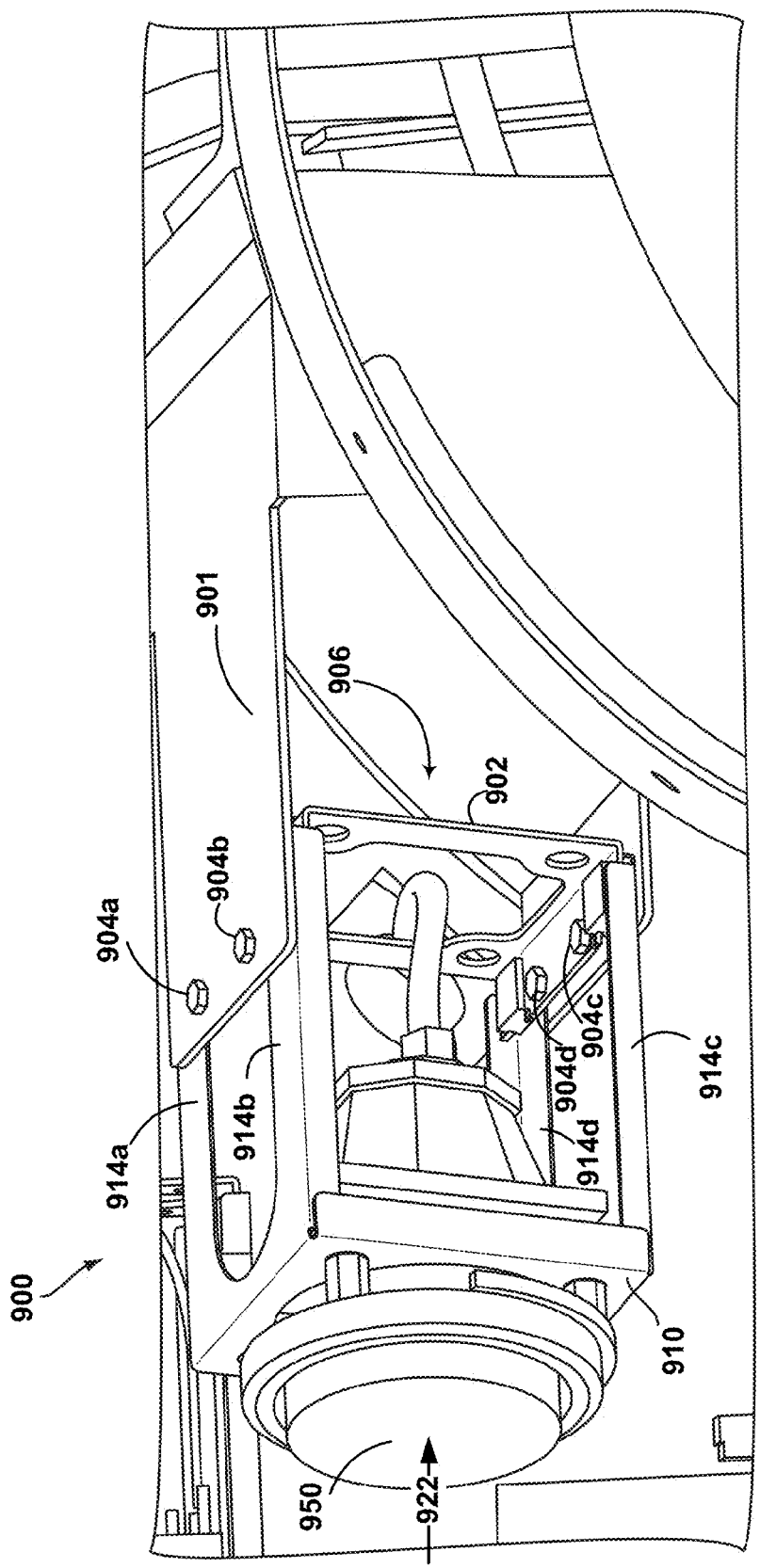
FIG. 9 illustrates an example system coupled to a vehicle support frame.

FIG. 9 illustrates an example system 900 coupled to a vehicle support frame, in accordance with at least some embodiments disclosed herein. FIG. 9 includes the support frame 901, a mounting module 902, fasteners 904a, 904b, 904c, and 904d, a receiving area 906, an object-support module 910, a motion-guiding module comprising rails 914a, 914b, 914c, and 914d, a threshold force 922, and an object 950.

The support frame 901 may be a support frame of a car, among other examples. The support frame may be rigidly coupled to the mounting module 902 via fasteners 904a-d and mounting holes of the mounting module 902. Other methods of fastening are possible. The mounting module 902 may include a receiving area 906 configured to allow the object 950 to pass through the receiving area 906.

The object-support module 910 may be coupled to an object 950, such as a vehicle headlight. The object-support module 910 may be configured to move, together with the object 950, along a first axis of the system 900 in response to the threshold force 922 being applied to the object 950 or the object-support module 910.

The motion-guiding module may include metal rails 914a-d configured to guide motion of the object-support module 910 along the first axis of the system 900. In other examples, the motion-guiding module 914 may include a compressible section that compresses in response to the threshold force 922 applied to the object-support module 910, as depicted in FIGS. 7 and 8.

As shown in FIG. 9, the object 950 may be configured to move along with the object-support module 910 in response to the threshold force 922 being applied to the object 950 or the object-support module 910. Also, at least a portion of the object 950 may be configured to move through the receiving area 906.

Figure 10:
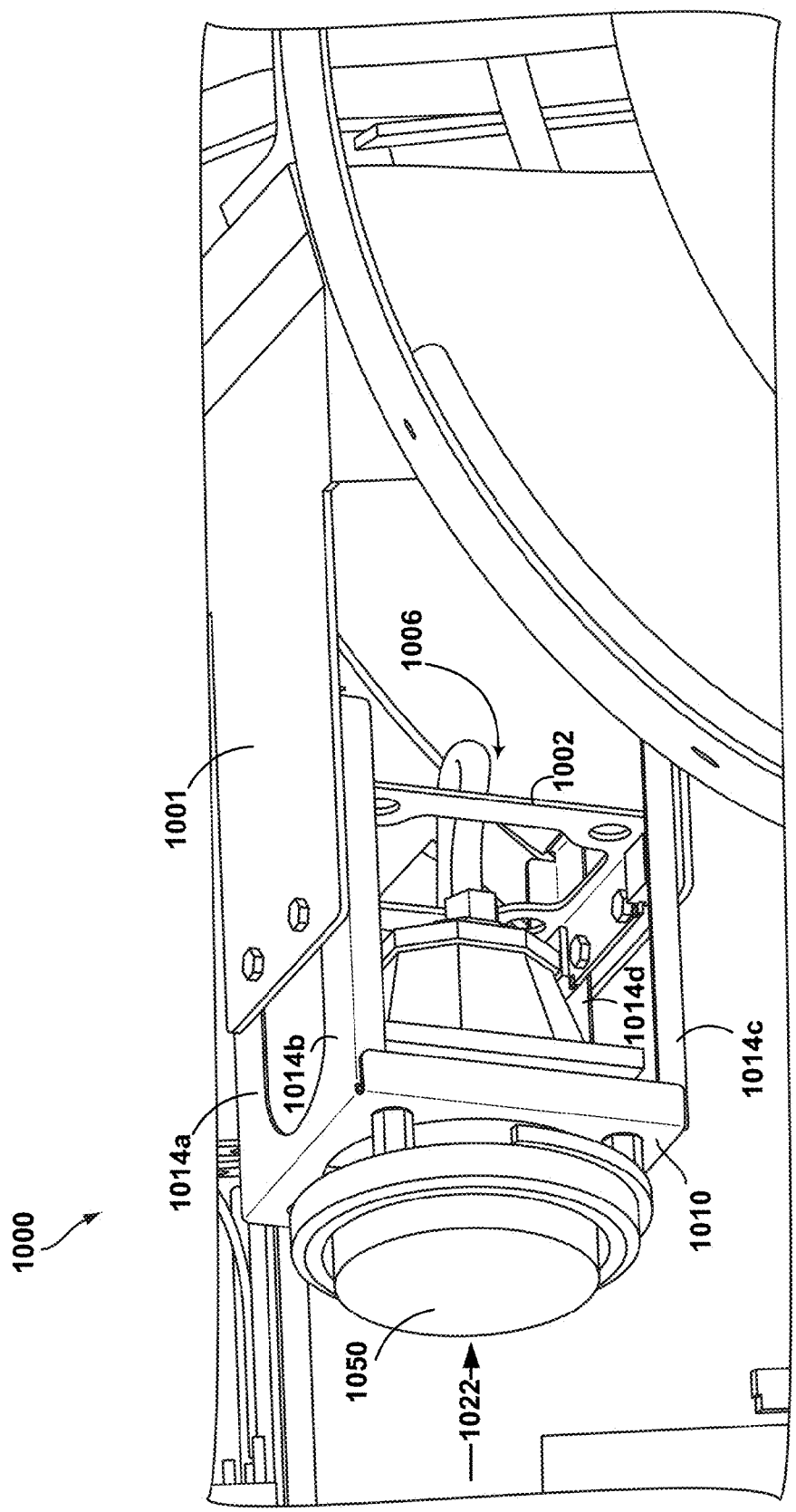
FIG. 10 illustrates an example system coupled to a vehicle support frame.

FIG. 10 illustrates an example system 1000 coupled to a vehicle support frame, in accordance with at least some embodiments disclosed herein. FIG. 10 includes a support frame 1001, a mounting module 1002, a receiving area 1006, an object-support module 1010, a motion-guiding module comprising rails 1014a, 1014b, 1014c, and 1014d, a threshold force 1022, and an object 1050.

FIG. 10 shows the system 1000 after the object-support module 1010 has moved toward the mounting module 1002 along a first axis of the system 1000 in response to the threshold force 1022 being applied to the object-support module 1010 or the object 1050. In such a case, the rails 1014a-d of the motion-guiding module, a friction strip attached to one of the rails 1014a-d, or magnets of the mounting module 1002 may have absorbed at least some of an impact force applied to the object-support module 1010 along the first axis 1018.

Figure 11:
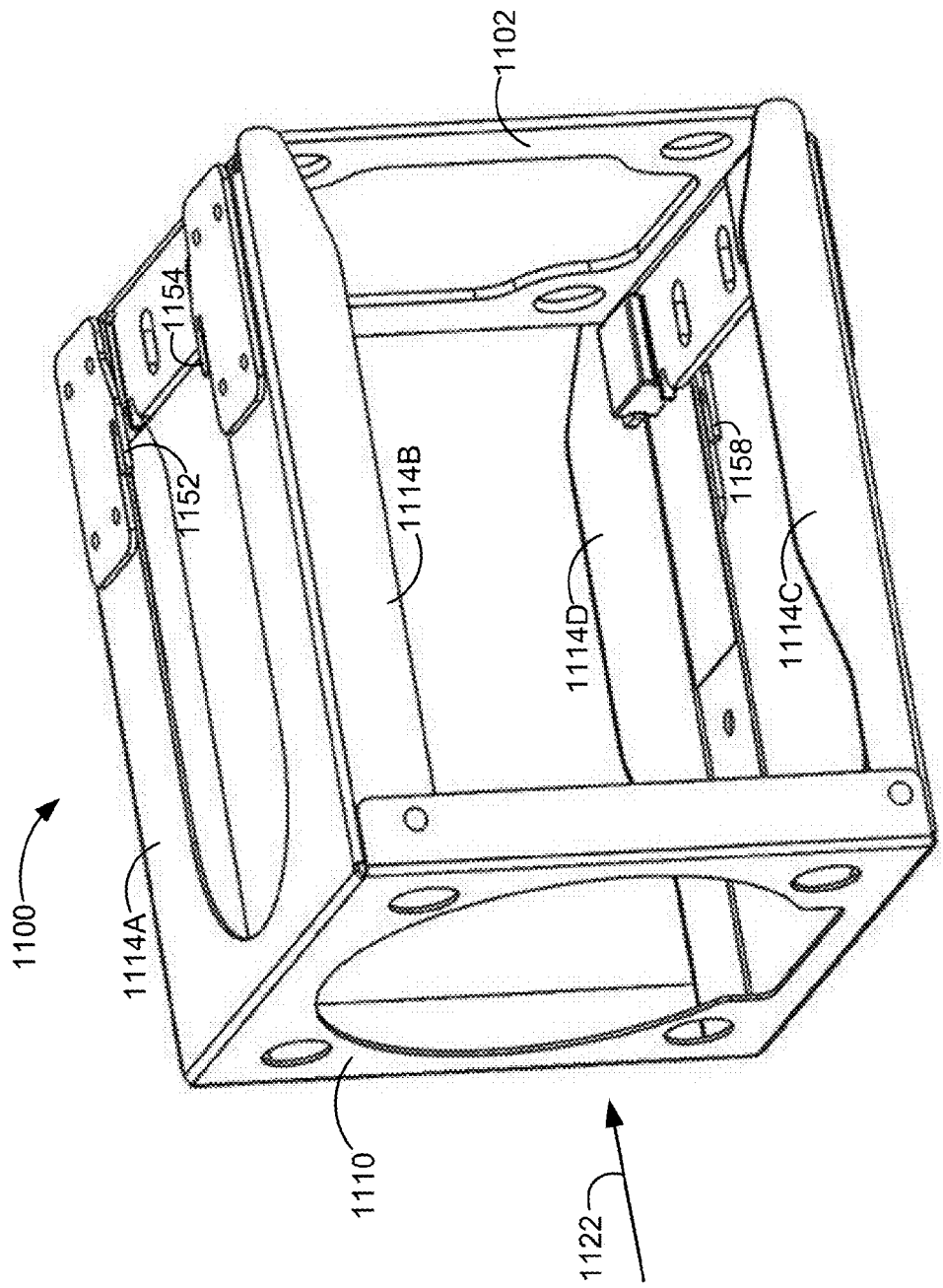
FIG. 11 is a first perspective view of an example apparatus with deformable tabs that are set in a position to allow motion of a component-support module.
Figure 14:
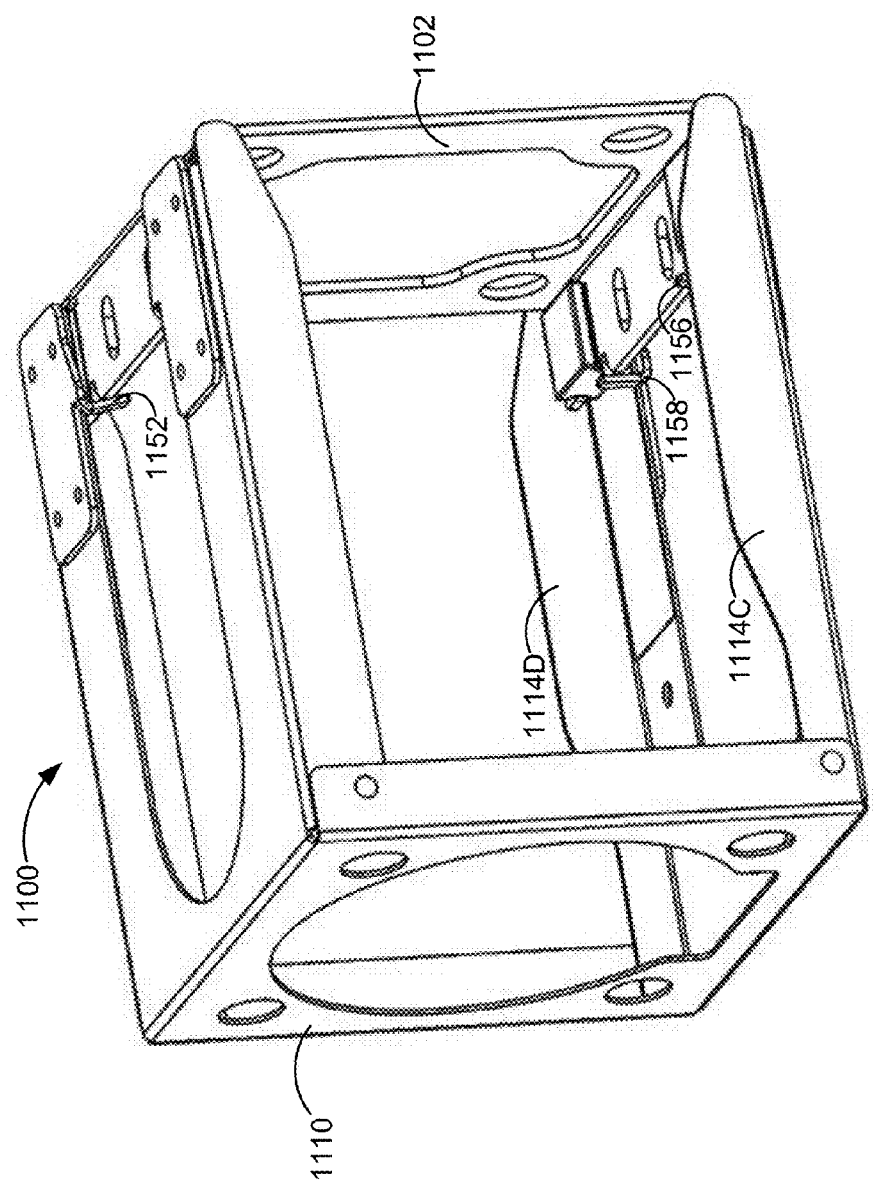
FIG. 14 is a first perspective view of an example apparatus with deformable tabs that are set in a position to resist motion of a component-support module.

FIG. 11 is a first perspective view of an example apparatus 1100 that includes deformable tabs 1152, 1154, and 1158 that are set in a position to allow motion of component-support module 1110. (A fourth deformable tab 1156 that is visible in FIG. 14 is obscured by rail 1114C in FIG. 11.)

The component-support module 1110 may be similar in structure and/or function to any of object-support modules 310, 410, 510, 610, 710, 810, 910, or 1010 described above. In some examples, the component-support module 1110 may be referred to as a headlight-support module and may be configured to support a headlight of the vehicle 100 or 200, for example.

FIG. 11 further illustrates a mounting module 1102 and a motion-guiding module comprising rails 1114A, 1114B, 1114C, and 1114D. The apparatus 1100 may be similar in structure and/or function to any of the systems 300, 400, 500, 600, 700, 800, 900, or 1000 described above.

As shown in FIG. 11, the deformable tabs 1152-1158 may be coupled to the motion-guiding module. More specifically, deformable tab 1152 may be coupled to the rail 1114A, the deformable tab 1154 may be coupled to the rail 1114B, the deformable tab 1156 (not shown in FIG. 11) may be coupled to the rail 1114C, and the deformable tab 1158 may be coupled to the rail 1114D. In FIG. 11, the deformable tabs 1152-1158 are depicted in an "unengaged" position. That is, the deformable tabs 1152-1158 may be aligned substantially parallel to respective rails 1114A-D such that the apparatus 1100 allows the component-support module 1110 to move toward the mounting module 1102 in response to a force 1122 applied to the component-support module 1110 (or applied to a component mounted to the component-support module 1110).

Figure 12:
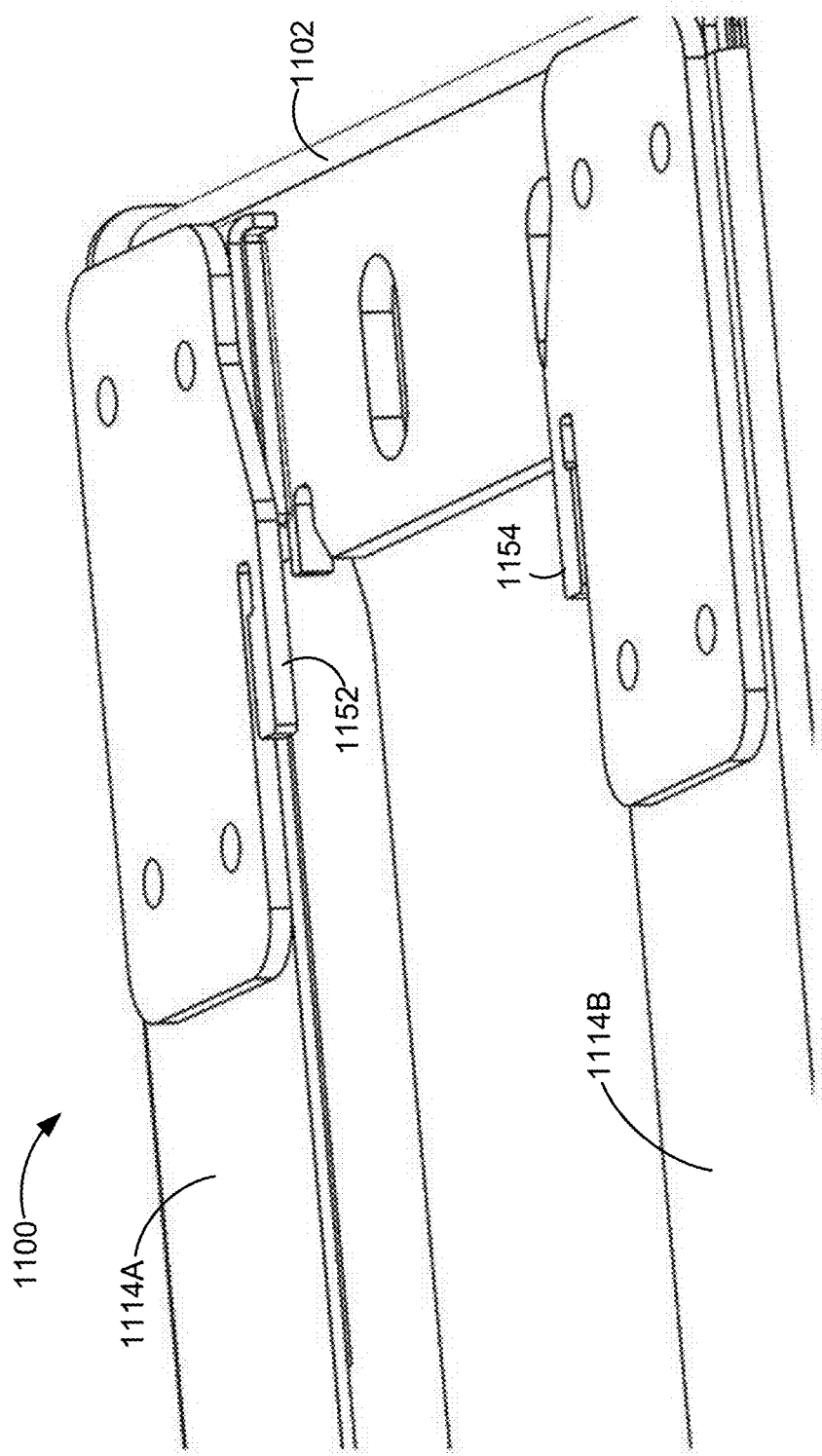
FIG. 12 is a close-up view of an example apparatus with deformable tabs that are set in a position to allow motion of a component-support module.

FIG. 12 is a close-up view of the apparatus 1100 depicted in FIG. 11. As shown in FIG. 12, the deformable tabs 1152 and 1154 are in a position to allow motion of the component-support module 1110 toward the mounting module 1102.

Figure 13:
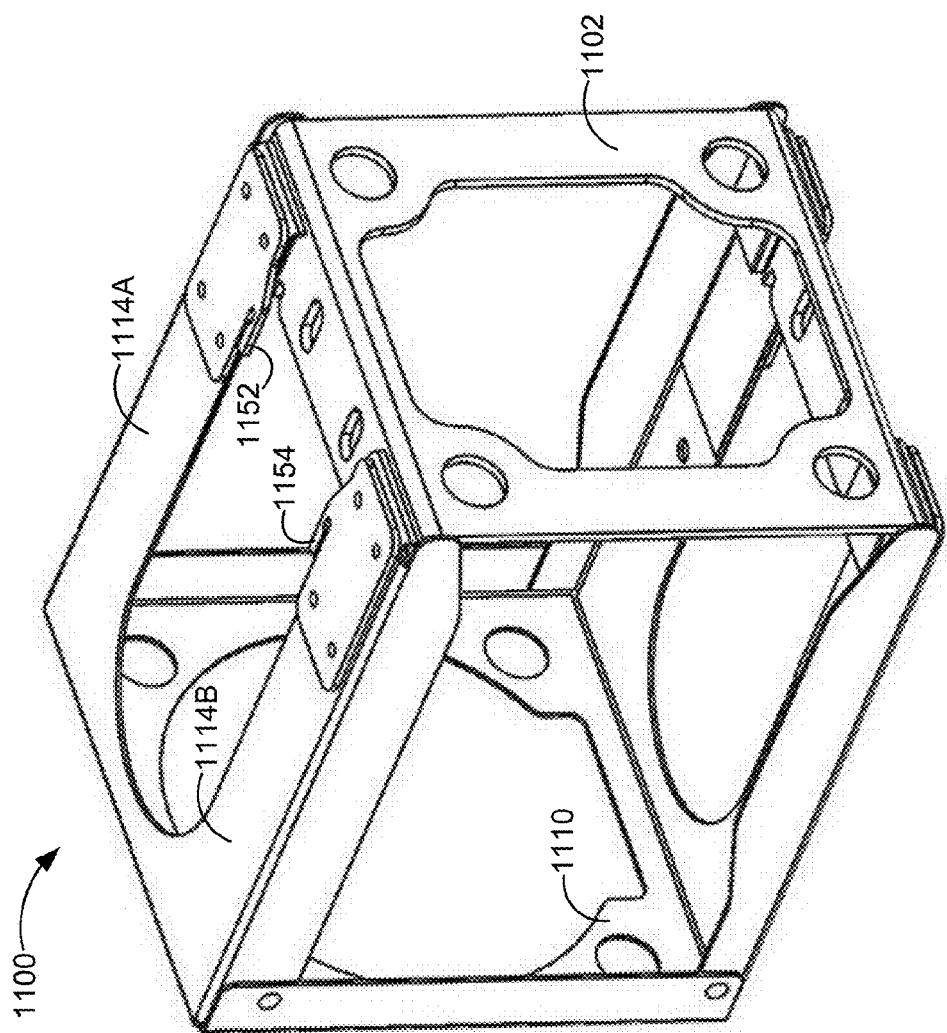
FIG. 13 is a second perspective view of an example apparatus with deformable tabs that are set in a position to allow motion of a component-support module.

FIG. 13 is a second perspective view of the apparatus 1100 depicted in FIGS. 11 and 12. As shown in FIG. 13, the deformable tabs 1152 and 1154 are set in a position to allow motion of the component-support module 1110 toward the mounting module 1102.

FIG. 14 is a first perspective view of the apparatus 1100 showing the deformable tabs 1152, 1156, and 1158 in an "engaged" position to resist motion of the component-support module 1110 toward the mounting module 1102. As shown in FIG. 14, the deformable tabs 1152-1158 have been bent or deformed to at least partially wrap around respective portions of the mounting module 1102 such that the apparatus 1100 resists motion of the component-support module 1110 toward the mounting module 1102. The deformable tabs 1152-1158 may have particular thicknesses and/or lengths that correspond to the predetermined level of force that is required to deform the deformable tabs 1152-1158 back into the unengaged position that allows motion of the component-support module 1110 toward the mounting module 1102.

Figure 15:
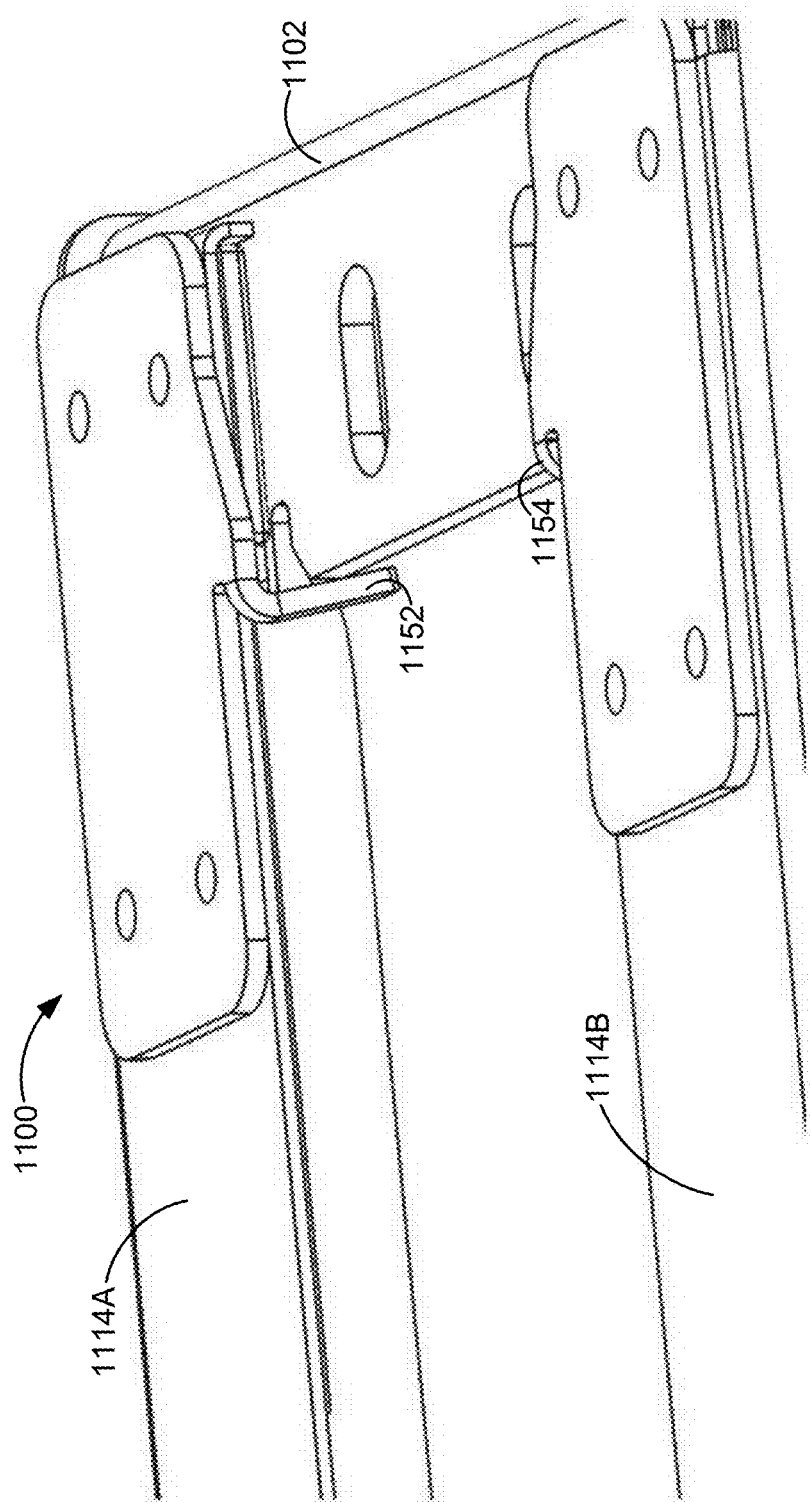
FIG. 15 is a close-up view of an example apparatus with deformable tabs that are set in a position to resist motion of a component-support module.

FIG. 15 is a close-up view of the apparatus 1100. As shown in FIG. 15, the deformable tabs 1152 and 1154 are in an engaged position to resist motion of the component-support module 1110 toward the mounting module 1102.

Figure 16:
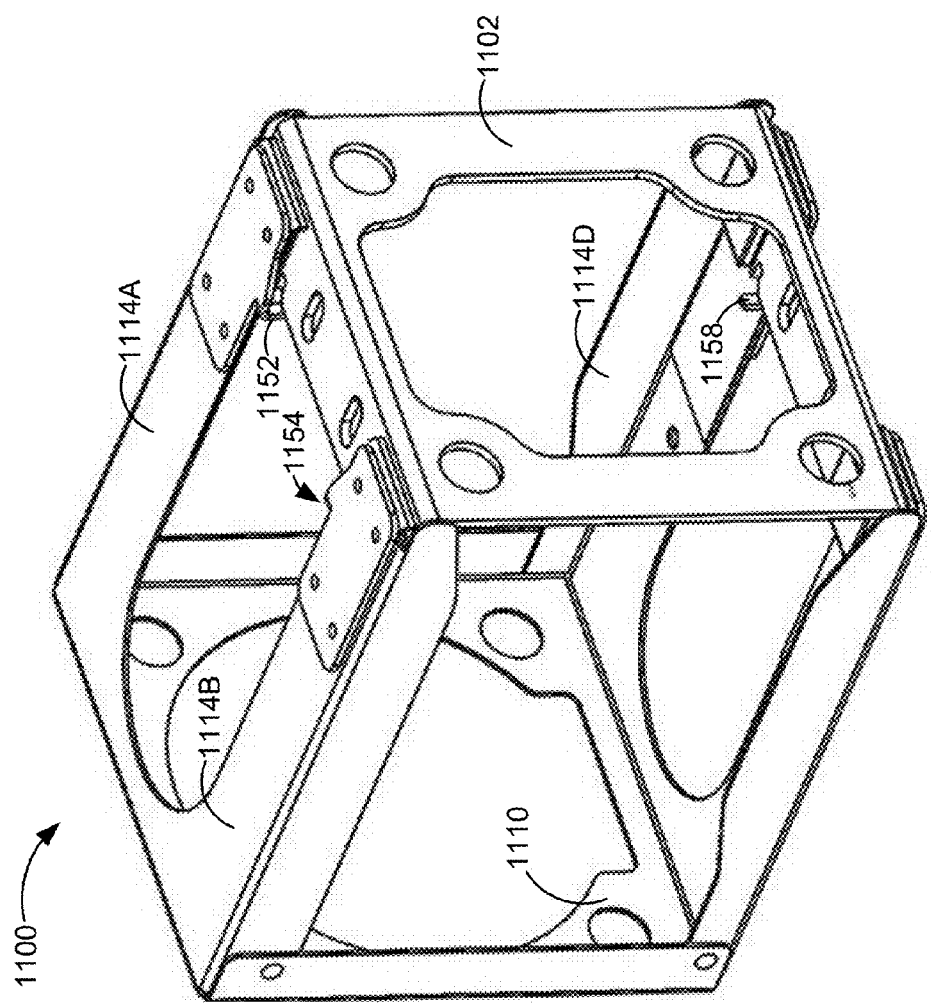
FIG. 16 is a second perspective view of an example apparatus with deformable tabs that are set in a position to resist motion of a component-support module.

FIG. 16 is a second perspective view of the apparatus 1100. As shown in FIG. 16, the deformable tabs 1152, 1154, and 1158 are set in an engaged position to resist motion of the component-support module 1110 toward the mounting module 1102.

Figure 17:
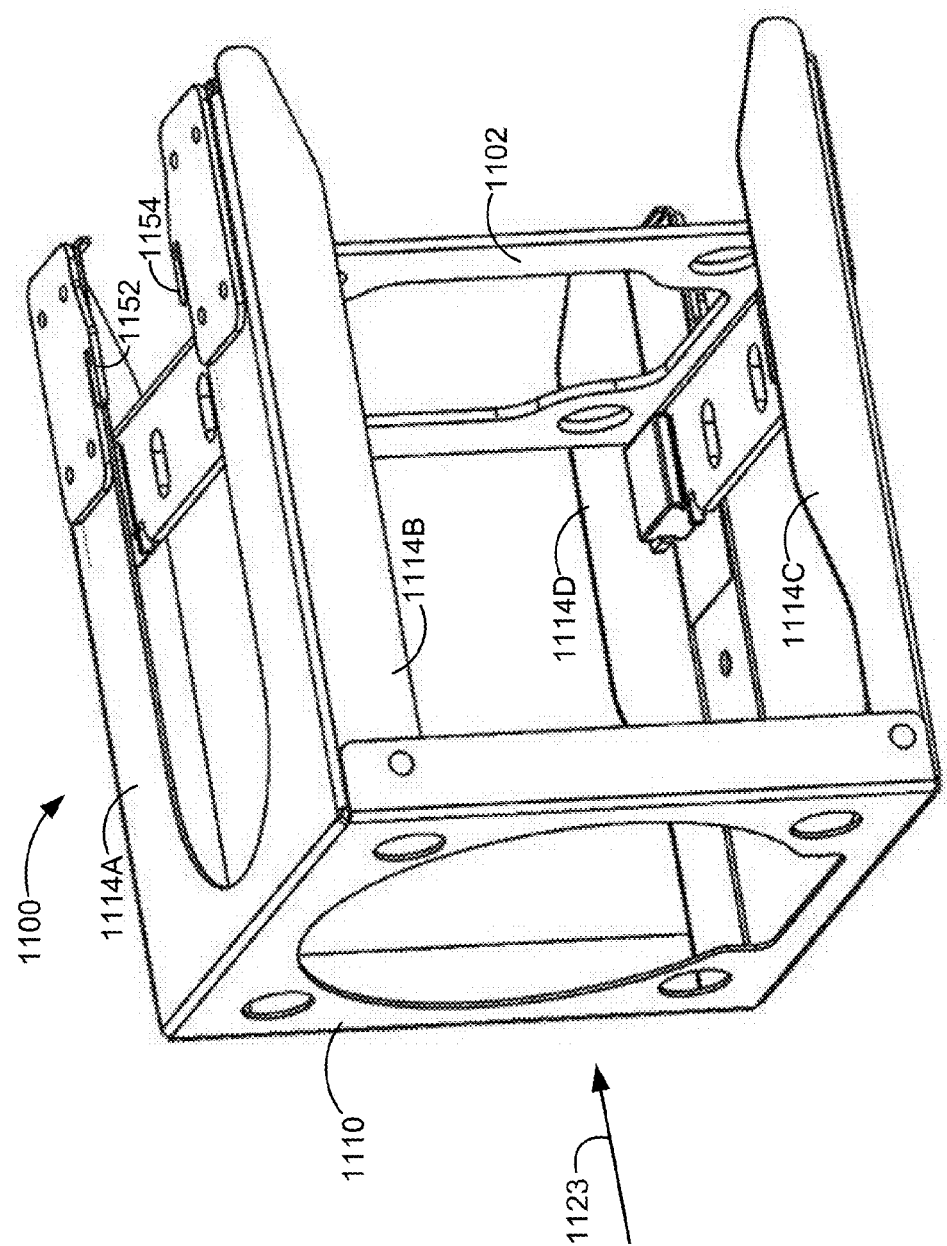
FIG. 17 is a first perspective view of an example apparatus after deformable tabs have deformed to a position that allows motion of a component-support module.

FIG. 17 is a first perspective view of the apparatus 1100 after the deformable tabs 1152-1158 have deformed to an unengaged position that allows motion of the component-support module 1110 toward the mounting module 1102. As shown in FIG. 17, a force 1123 of at least the predetermined level has been applied to the component-support module 1110 (or the component supported by the component-support module 1110), causing the deformable tabs 1152-1158 to deform back to the unengaged position. This allows the component-support module 1110 to move toward the mounting module 1102 in response to impact forces that are perhaps less than the predetermined level of force that corresponds to the deformation of the deformable tabs 1152-1158 from the engaged to the unengaged position.

Figure 18:
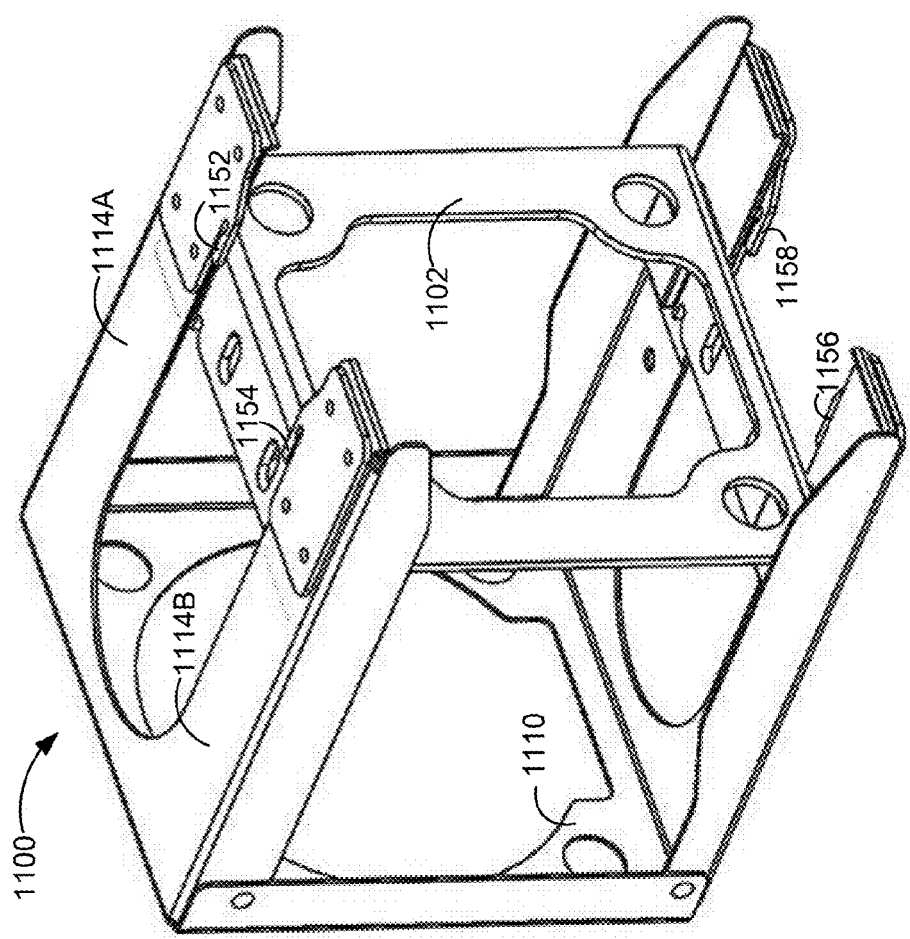
FIG. 18 is a second perspective view of an example apparatus after deformable tabs have deformed to a position that allows motion of a component-support module.

FIG. 18 is a second perspective view of the apparatus 1100 after the deformable tabs 1152-1158 have absorbed a force of at least the predetermined level and have deformed to the unengaged position that allows motion of the component-support module 1110 toward the mounting module 1102.

Figure 19:
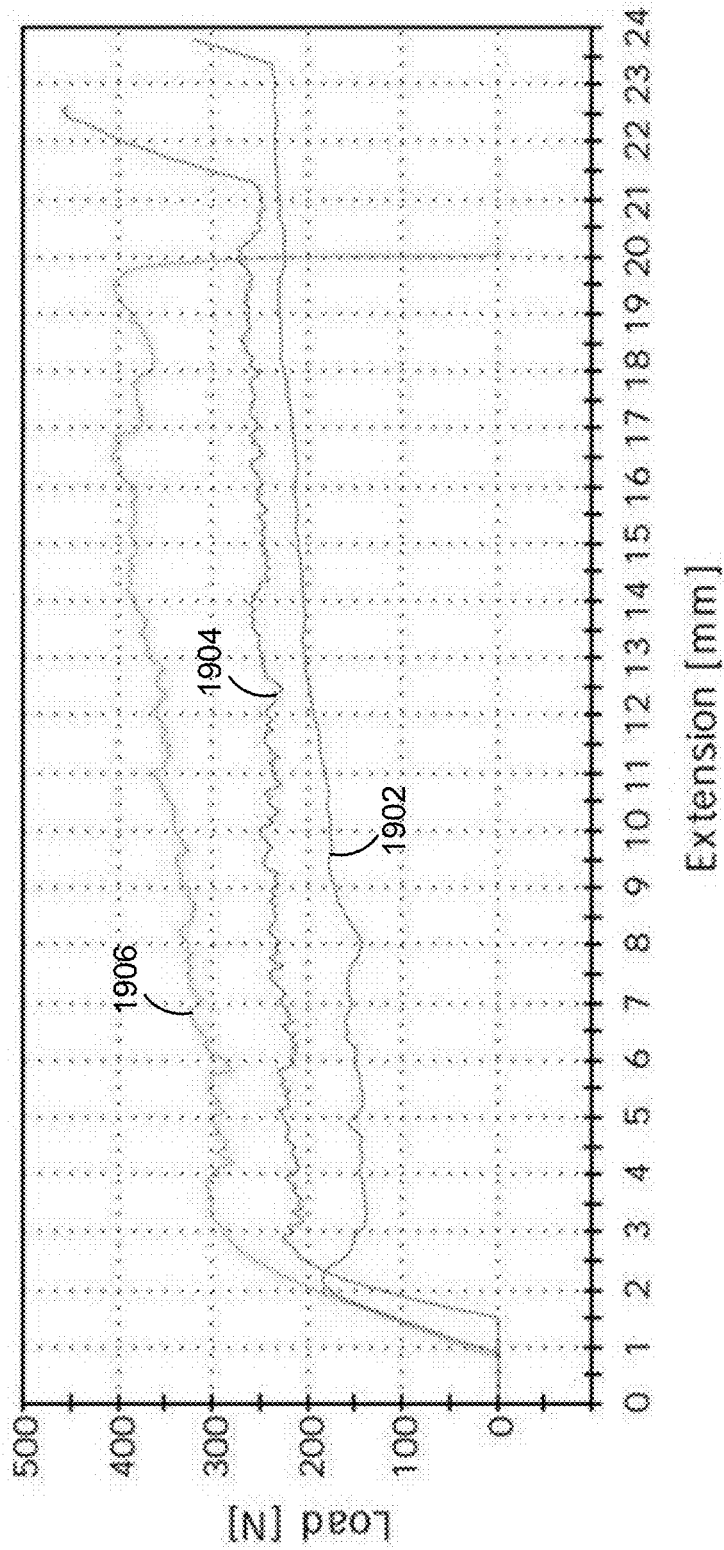
FIG. 19 is a graphical depiction of impact force data related to operation of an example apparatus that does not involve the use of deformable tabs configured to resist motion.

FIG. 19 is a graphical depiction of impact force data related to operation of the apparatus 1100. Notably however, the impact force data depicted in FIG. 19 does not involve the use of the one or more deformable tabs 1152-1158. In various examples, materials such as friction tape may be used to increase friction between the motion-guiding module (e.g., rails 1114A-D) and the mounting module 1102, thereby at least partially converting forces impacting the component-support module 1110 into frictional heat. (In other examples involving apparatus of varying structure, materials may be used to increase friction between the component-support module 1110 and the motion-guiding module.)

Curve 1902 represents force absorbed by the apparatus 1100 as the component-support module 1110 is moved toward the mounting module 1102. (In FIG. 19, movement of the component-support module 1110 toward the mounting module 1102 corresponds to increasing "extension" values on the horizontal axis of FIG. 19.) Curve 1902 corresponds to the use of a first friction material, curve 1904 corresponds to the use of a second friction material, and curve 1906 corresponds to the use of a third friction material.

As shown by curve 1902, use of the first friction material corresponds to a static frictional threshold force of approximately 180 newtons that must be applied to the component-support module 1110 before the component-support module 1110 can move more than about 2.25 mm toward the mounting module 1102.

As shown by curve 1904, use of the second friction material corresponds to a static frictional threshold force of approximately 225 newtons that must be applied to the component-support module 1110 before the component-support module 1110 can move more than about 3 mm toward the mounting module 1102.

As shown by curve 1906, use of the third friction material corresponds to a static frictional threshold force of approximately 300 newtons that must be applied to the component-support module 1110 before the component-support module 1110 can move more than about 4 mm toward the mounting module 1102.

Figure 20:
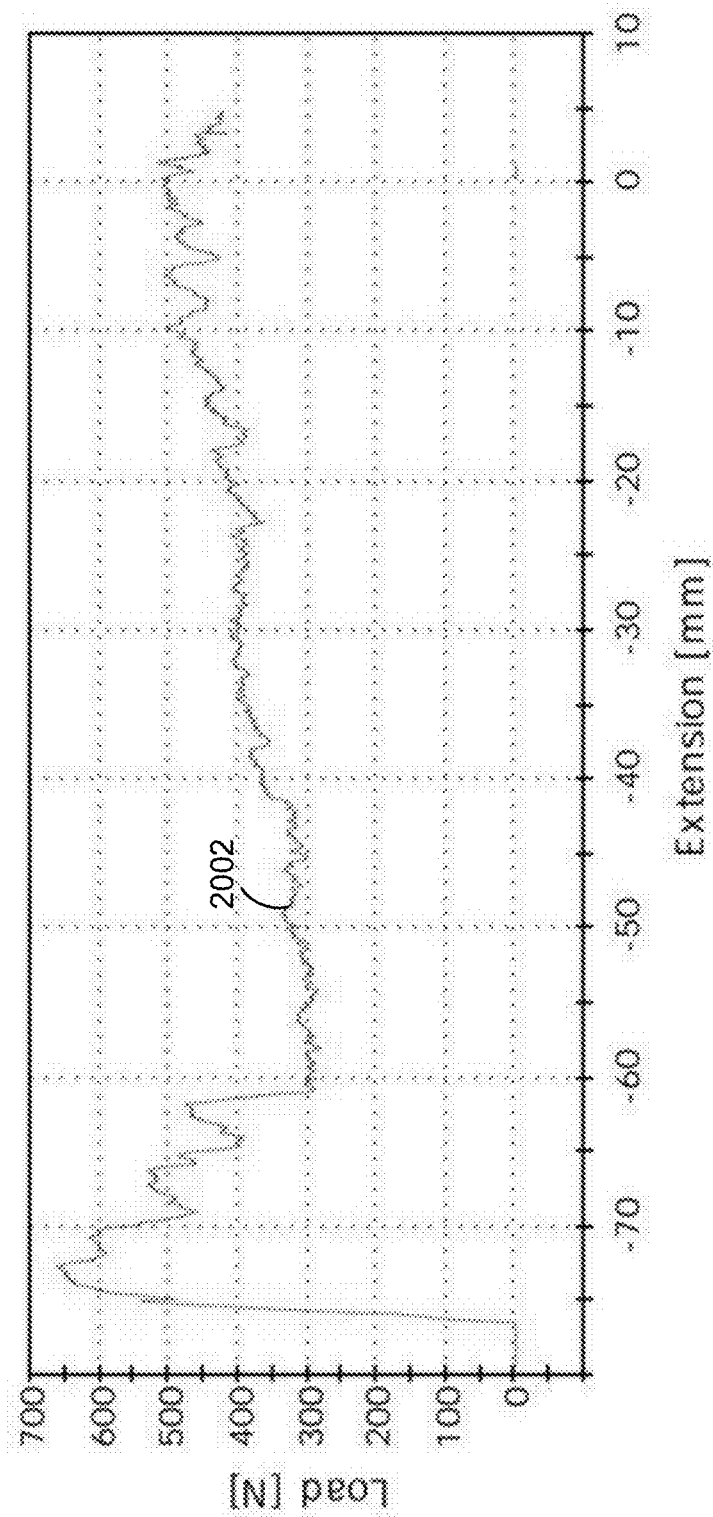
FIG. 20 is a graphical depiction of impact force data related to operation of an example apparatus that does involve the use of deformable tabs configured to resist motion.

FIG. 20 is a graphical depiction of impact force data related to operation of the apparatus 1100. Notably, the impact force data depicted in FIG. 20 involves the use of the deformable tabs 1152-1158. (In FIG. 20, movement of the component-support module 1110 toward the mounting module 1102 corresponds to increasing "extension" values on the horizontal axis of FIG. 20.) As shown by curve 2002, use of the deformable tabs 1152-1158 may correspond to a static frictional threshold force of approximately 650 newtons that must be applied to the component-support module 1110 before the component-support module 1110 can move more than about 7 mm toward the mounting module 1102. In other examples, use of the deformable tabs 1152-1158 may correspond to any static frictional threshold force that is greater than 400 newtons and less than 1000 newtons that is applied to the component-support module 1110 before the component-support module 1110 can move an arbitrary distance toward the mounting module 1102.

In the examples described above, the use of materials such as friction tape may correspond to a static frictional threshold force of at most about 300 newtons that must be applied to the component-support module 1110 before the component-support module 1110 can move significantly toward the mounting module 1102. Therefore, use of the deformable tabs 1152-1158 makes it more likely that the component-support module 1110 moves toward the mounting module 1102 only in response to impact forces that are of a level expected during a collision with a pedestrian or a roadway obstruction, for example. Use of the deformable tabs 1152-1158 makes it less likely that incidental forces corresponding to a bumpy driving surface for example will cause the component-support module 1110 to move toward the mounting module 1102.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An apparatus comprising:
a mounting module configured to be coupled to a support frame of a vehicle;

a component-support module configured to support a component of the vehicle;

a motion-guiding module coupled to the component-support module and the mounting module, wherein the motion-guiding module is configured to guide motion of the component-support module toward the mounting module; and a deformable tab coupled to the motion-guiding module, wherein the deformable tab is configured to:
in response to the deformable tab absorbing a force that is less than a predetermined level, resist motion of the component-support module toward the mounting module; and
in response to the deformable tab absorbing a force that is greater than the predetermined level, deform to a position that allows the component-support module to move toward the mounting module in response to force applied to the component-support module.

2. The apparatus of claim 1, wherein the mounting module is configured to be coupled to the support frame via one or more fasteners.

3. The apparatus of claim 1, wherein the motion-guiding module is configured to guide motion of the component-support module along a first axis of the apparatus, and wherein the motion-guiding module is configured to resist motion of the component-support module along a second axis of the apparatus that is perpendicular to the first axis.

4. The apparatus of claim 1, wherein the motion-guiding module comprises a rail configured to guide motion of the component-support module toward the mounting module.

5. The apparatus of claim 1, wherein the component is a headlight.

6. The apparatus of claim 1, wherein the mounting module comprises an area configured to allow at least a portion of the component to pass through the area.

7. The apparatus of claim 1, wherein the predetermined level is greater than 400 newtons and less than 1000 newtons.

8. The apparatus of claim 1, wherein the motion-guiding module is configured to absorb an impact force via friction between the (i) motion-guiding module and (ii) the mounting module or the component-support module.

9. A vehicle comprising:
a support frame;
a mounting module coupled to the support frame;
a component-support module configured to support a component of the vehicle;
a motion-guiding module coupled to the component-support module and the mounting module, wherein the motion-guiding module is configured to guide motion of the component-support module toward the mounting module; and
a deformable tab coupled to the motion-guiding module, wherein the deformable tab is configured to:
in response to the deformable tab absorbing a force that is less than a predetermined level, resist motion of the component-support module toward the mounting module; and
in response to the deformable tab absorbing a force that is greater than the predetermined level, deform to a position that allows the component-support module to move toward the mounting module in response to force applied to the component-support module.

10. The vehicle of claim 9, wherein the mounting module is coupled to the support frame via one or more fasteners.

11. The vehicle of claim 9, wherein the motion-guiding module is configured to guide motion of the component-support module along a first axis of the apparatus, and wherein the motion-guiding module is configured to resist motion of the component-support module along a second axis of the apparatus that is perpendicular to the first axis.

12. The vehicle of claim 9, wherein the motion-guiding module comprises a rail configured to guide motion of the component-support module toward the mounting module.

13. The vehicle of claim 9, wherein the component is a headlight.

14. The vehicle of claim 9, wherein the mounting module comprises an area configured to allow at least a portion of the component to pass through the area.

15. The vehicle of claim 9, wherein the predetermined level is greater than 400 newtons and less than 1000 newtons.

16. The vehicle of claim 9, wherein the motion-guiding module is configured to absorb an impact force via friction between the (i) motion-guiding module and (ii) the mounting module or the component-support module.

17. An apparatus comprising:
a mounting module configured to be coupled to a support frame of a vehicle;
a headlight-support module configured to support a headlight of the vehicle;
a motion-guiding module coupled to the headlight-support module and the mounting module, wherein the motion-guiding module is configured to guide motion of the headlight-support module toward the mounting module, and wherein the motion-guiding module or the mounting module comprises a magnet configured to absorb an impact force via an attractive magnetic force between the magnet and the motion-guiding module or the mounting module; and
a deformable tab coupled to the motion-guiding module, wherein the deformable tab is configured to:
in response to the deformable tab absorbing a force that is less than a predetermined level, resist motion of the headlight-support module toward the mounting module; and
in response to the deformable tab absorbing a force that is greater than the predetermined level, deform to a position that allows the headlight-support module to move toward the mounting module in response to force applied to the headlight-support module.

18. The apparatus of claim 17, wherein the motion-guiding module comprises a rail configured to guide motion of the headlight-support module toward the mounting module.

19. The apparatus of claim 17, wherein the mounting module is configured to be coupled to the support frame via one or more fasteners.

20. The apparatus of claim 17, wherein the predetermined level is greater than 400 newtons and less than 1000 newtons.

* * * * *